US011944968B2

(12) United States Patent
Zafar et al.

(10) Patent No.: US 11,944,968 B2
(45) Date of Patent: Apr. 2, 2024

(54) MICROFLUIDIC CHIPS WITH INTEGRATED ELECTRONIC SENSORS

(71) Applicant: International Business Machines Corporation, Armonk, NY (US)

(72) Inventors: Sufi Zafar, Briarcliff Manor, NY (US); Yuksel Temiz, Zug (CH); Emmanuel Delamarche, Thalwil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/811,096

(22) Filed: Jul. 7, 2022

(65) Prior Publication Data

US 2022/0362768 A1 Nov. 17, 2022

Related U.S. Application Data

(62) Division of application No. 16/775,777, filed on Jan. 29, 2020, now Pat. No. 11,453,001.

(51) Int. Cl.
*B01L 3/00* (2006.01)

(52) U.S. Cl.
CPC . *B01L 3/502715* (2013.01); *B01L 2200/0684* (2013.01); *B01L 2200/12* (2013.01); *B01L 2300/0645* (2013.01); *B01L 2300/0861* (2013.01); *B01L 2300/12* (2013.01); *B01L 2300/165* (2013.01)

(58) Field of Classification Search
CPC ........... B01L 3/502715; B01L 2200/12; B01L 2300/0861
See application file for complete search history.

(56) References Cited

U.S. PATENT DOCUMENTS

| | | | |
|---|---|---|---|
| 6,783,645 | B2 | 8/2004 | Cheng et al. |
| 7,390,457 | B2 | 6/2008 | Schembri |
| 8,444,835 | B2 | 8/2013 | Elibol et al. |
| 9,103,786 | B2 | 8/2015 | Maltezos et al. |
| 9,126,161 | B2 | 9/2015 | Lee et al. |
| 9,782,770 | B2 | 10/2017 | Buermann et al. |

(Continued)

FOREIGN PATENT DOCUMENTS

| | | | |
|---|---|---|---|
| CN | 104704357 | A | 6/2015 |
| KR | 10-2013-125686 | A | 11/2013 |

(Continued)

OTHER PUBLICATIONS

International Search Report and Written Opinion received for PCT Application Serial No. PCT/IB2020/061682 dated Mar. 15, 2021, 09 pages.

(Continued)

*Primary Examiner* — Brian J. Sines
(74) *Attorney, Agent, or Firm* — Amin, Turocy & Watson, LLP

(57) ABSTRACT

Techniques regarding one or more microfluidic chips with integrated electronic sensors are provided. For example, one or more embodiments described herein can regard an apparatus that can comprise a conductive plug of a reference electrode structure, the conductive plug extending from within a microfluidic channel to within a reference fluid holding chamber that is in fluid isolation from the microfluidic channel.

5 Claims, 20 Drawing Sheets

(56) References Cited

U.S. PATENT DOCUMENTS

| | | | |
|---|---|---|---|
| 9,791,398 B2 | 10/2017 | Clark et al. | |
| 10,436,735 B2 | 10/2019 | Lauks et al. | |
| 11,453,001 B2 * | 9/2022 | Zafar | B01L 3/502715 |
| 2009/0230044 A1 | 9/2009 | Bek et al. | |
| 2011/0192720 A1 | 8/2011 | Blauw et al. | |
| 2015/0024436 A1 | 1/2015 | Eberhart et al. | |
| 2018/0038499 A1 | 2/2018 | Juncker et al. | |
| 2019/0094178 A1 | 3/2019 | Delamarche et al. | |
| 2019/0178787 A1 | 6/2019 | Anderson et al. | |

FOREIGN PATENT DOCUMENTS

| | | |
|---|---|---|
| KR | 10-2019-0129403 A | 11/2019 |
| WO | 03027508 A1 | 4/2003 |
| WO | 2019064110 A1 | 4/2019 |

OTHER PUBLICATIONS

Komiyama et al., “A Microfluidic Device Fully Integrated with Three pH Sensing Electrodes and Passive Mixerfor Nanoparticle Synthesis”, IEEE Sensors, Dec. 31, 2015, 04 pages.

Isoyama et al., “A Feasibility Study on the Simultaneous Sensing of Turbidity and Chlorophyll a Concentration Using a Simple Optical Measurement Method”, Micromachines, vol. 8, No. 04, Apr. 1, 2017, 11 pages.

Zhang et al., “Design, Preparation and Performance Study of On-Chip Flow-Through Amperometric Sensors with an Integrated Ag/AgCl Reference Electrode”, Micromachines, vol. 9, No. 3, Mar. 7, 2018, 11 pages.

Office Action for U.S. Appl. No. 16/775,777 dated Oct. 4, 2021, 24 pages.

Ist of IBM Patents or Applications Treated as Related.

Temiz, et al. “Lab-on-a-chip devices: How to close and plug the lab?” Microelectronic Engineering 132 (2015) 156-175. 20 pages.

Zafar, et al. “Electronic Chemical Sensor” U.S. Appl. No. 16/186,977, filed Nov. 12, 2018. 70 pages.

* cited by examiner

2000

MICROFLUIDIC CHIPS WITH INTEGRATED ELECTRONIC SENSORS

BACKGROUND

The subject disclosure relates to one or more electronic sensors integrated onto a microfluidic chip, and more specifically, to one or more electronic sensors comprising one or more reference electrode structures that can be integrated into one or more microfluidic chips.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, apparatuses and/or methods of manufacture regarding microfluidic chips with integrated electronic sensors are described.

According to an embodiment, an apparatus is provided. The apparatus can comprise a conductive plug of a reference electrode structure, the conductive plug extending from within a microfluidic channel to within a reference fluid holding chamber that is in fluid isolation from the microfluidic channel.

According to an embodiment, a method is provided. The method can comprise depositing a conductive plug onto a substrate surface. The method can also comprise forming, via an additive process, a microfluidic channel and a reference fluid holding chamber on the substrate surface such that a wall between the microfluidic channel and the reference fluid holding chamber extends across the conductive plug.

According to another embodiment, a method is provided. The method can comprise fabricating a microfluidic channel and a reference fluid holding chamber from a polymer material. The method can also comprise inserting a metal wire through a wall that isolates the microfluidic channel from the reference fluid holding chamber such that a first portion of the metal wire is positioned within the microfluidic channel and a second portion of the metal wire is positioned within the reference fluid holding chamber.

DETAILED DESCRIPTION

Figure 1A:
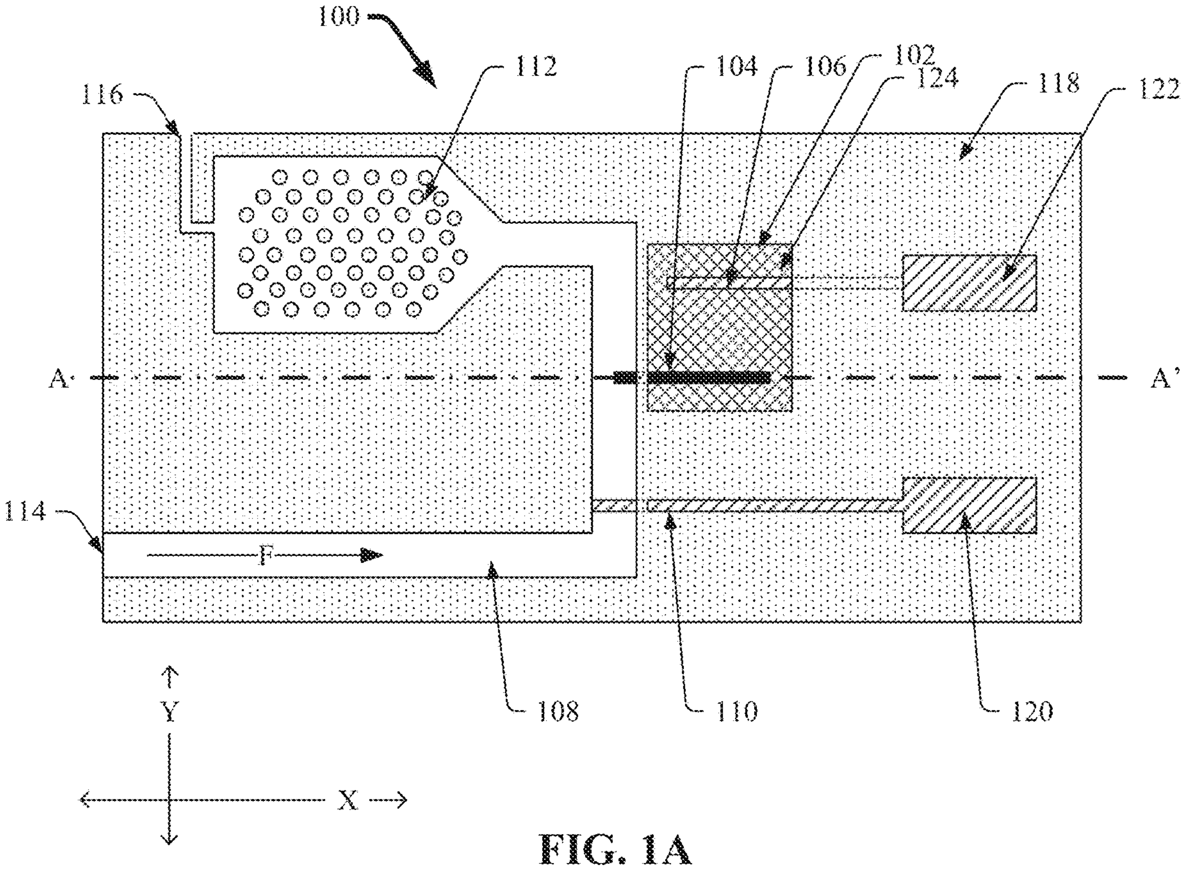
FIG. 1A illustrates a diagram of an example, non-limiting top-down view of a microfluidic chip comprising one or more integrated electronic sensors in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. Additionally, features depicted in the drawings with like shading, cross-hatching, and/or coloring can comprise shared compositions and/or materials.

Optical sensors are widely used for the detection of analytes in microfluidic chips. Electronic sensors can provide increased portability, sensitivity, and resolution at reduced costs. However, electronic sensors comprise a reference electrode that needs to be stored in solution and introduced into the given sample at the moment of use. Thus, conventional use of electronic sensors with microfluidic chips requires an undesirable amount of user intervention to properly store and/or operate the reference electrode.

Various embodiments described herein can comprise apparatuses, and/or methods of manufacturing thereof, regarding electronic sensors that can be integrated within microfluidic chips. By integrating one or more electronic sensors into the microfluidic chip, one or more embodiments described herein can eliminate a requirement to insert the reference electrode into the microfluidic chip at the moment of use. For example, one or more embodiments can comprise reference electrode structures that can include a reference fluid holding chamber integrated within the microfluidic chip. Further, the one or more integrated reference electrode structures can comprise one or more conductive plugs extending from the reference fluid holding chamber into one or more channels of the microfluidic chip, and/or one or more reference electrodes extending from the reference fluid holding chamber to one or more contact pads. Thereby, the one or more reference electrode described in various embodiments herein can be stored within reference fluid integrated within the microfluidic chip while enabling the reference electrode to analyze a sample fluid flowing through the one or more channels.

As described herein, the terms "deposition process" and/or "deposition processes" can refer to any process that grows, coats, deposits, and/or otherwise transfers one or more first materials onto one or more second materials. Example deposition processes can include, but are not limited to: physical vapor deposition ("PVD"), chemical vaper deposition ("CVD"), electrochemical deposition ("ECD"), atomic layer deposition ("ALD"), low-pressure chemical vapor deposition ("LPCVD"), plasma enhanced chemical vapor deposition ("PECVD"), high density plasma chemical vapor deposition ("HDPCVD"), sub-atmospheric chemical vapor deposition ("SACVD"), rapid thermal chemical vapor deposition ("RTCVD"), in-situ radical assisted deposition, high temperature oxide deposition ("HTO"), low temperature oxide deposition ("LTO"), limited reaction processing CVD ("LRPCVD"), ultrahigh vacuum chemical vapor deposition ("UHVCVD"), metalorganic chemical vapor deposition ("MOCVD"), physical vapor deposition ("PVD"), chemical oxidation, sputtering, plating, evaporation, spin-on-coating, ion beam deposition, electron beam deposition, laser assisted deposition, chemical solution deposition, a combination thereof, and/or the like.

As described herein, the terms "etching process", "etching process", "removal process", and/or "removal processes" can refer to any process that removes one or more first materials from one or more second materials. Example etching and/or removal processes can include, but are not limited to: wet etching, dry etching (e.g., reactive ion etching ("RIE")), chemical-mechanical planarization ("CMP"), a combination thereof, and/or the like.

FIG. 1A illustrates a diagram of an example, non-limiting top-down view of a microfluidic chip 100 comprising one or more reference electrode structures in accordance with one or more embodiments described herein. Repetitive description of like elements employed in other embodiments described herein is omitted for sake of brevity. The one or more reference electrode structures can comprise a reference fluid holding chamber 102, a conductive plug 104, and/or a reference electrode 106. As shown in FIG. 1A, the microfluidic chip can further comprise one or more microfluidic channels 108, one or more sensing electrodes 110, and/or one or more microfluidic devices 112.

The one or more microfluidic channels 108 can extend between one or more chip inlets 114 and/or chip outlets 116. One of ordinary skill in the art will recognize that the layout and/or dimensions of the one or more microfluidic channels 108 can vary depending on the function of the microfluidic chip 100. Further, as shown in FIG. 1A, the one or more microfluidic channels 108 can connect to one or more microfluidic devices 112 comprised within the microfluidic chip 100. The one or more microfluidic devices 112 can serve to manipulate one or more sample fluids being analyzed and/or processed by the microfluidic chip 100. Example microfluidic devices 112 can include, but are not limited to: lateral displacement arrays, capillary pumps, inlets, outlets, channels, valves, vents, a combination thereof, and/or the like. In various embodiments, the one or more microfluidic channels 108 and/or microfluidic devices 112 can be defined by one or more chip walls 118. Example materials that can be comprised within the one or more chip walls 118 can include, but are not limited to: silicon, silicon dioxide, glass, polymers, photoresists (e.g., SU-8) epoxy films, hydrophobic materials (e.g., black silicon), a combination thereof, and/or the like.

During operation of the microfluidic chip 100, one or more sample fluids can be introduced into the one or more microfluidic channels 108 via the one or more chip inlets 114, whereupon the one or more microfluidic channels 108 can direct the one or more sample fluids to the one or microfluidic devices 112 and/or chip outlets 116. For example, the one or more sample fluids can flow through the one or more microfluidic channels 108 in accordance with the "F" arrow shown in FIG. 1A.

In one or more embodiments, at least a portion of one or more sensing electrodes 110 can be positioned within the one or more microfluidic channels 108. For example, the one or more sensing electrodes 110 can comprise a film of material positioned on the floor of the one or more microfluidic channels 108. In some embodiments, the one or more sensing electrodes 110 can extend across an entire width (e.g., along the "X" axis) of the microfluidic channel 108 (e.g., as shown in FIG. 1A). Alternatively, in some embodiments the one or more sensing electrodes 110 can extend across a portion of the width (e.g., along the "X" axis of the microfluidic channel 108. As shown in FIG. 1A, the one or more sensing electrodes 110 can extend through a chip wall 118 that defines the one or more microfluidic channels 108 to be positioned within the one or more microfluidic channels 108 (e.g., as delineated by dotted lines in FIG. 1A).

In various embodiments the one or more sensing electrodes 110 can extend to one or more sensing contact pads 120; which can be comprised of the same material as the one or more sensing electrodes 110 and/or can be positioned on the microfluidic chip 100 (e.g., as shown in FIG. 1A). In one or more embodiments, the one or more sensing electrodes 110 can extend to one or more transducers (e.g., positioned on or off the microfluidic chip 100). Example materials that can be comprised within the one or more sensing electrodes 110 can include, but are not limited to: titanium nitride, gold, silver chloride, a combination thereof, and/or the like. One of ordinary skill in the art will recognize that the layout and/or dimensions of the one or more sensing electrodes 110 can vary depending on the function of the microfluidic chip 100. During operation of the microfluidic chip 100, the one or more sample fluids can contact the one or more sensing electrodes 110 while flowing through the one or more microfluidic channels 108.

In one or more embodiments, at least a portion of one or more conductive plugs 104 can be positioned within the one or more microfluidic channels 108. For example, the one or more conductive plugs 104 can comprise a film of material positioned on the floor of the one or more microfluidic channels 108. In some embodiments, the one or more conductive plugs 104 can extend across an entire width (e.g., along the "X" axis) of the microfluidic channel 108 (e.g., as shown in FIG. 1A). Alternatively, in some embodiments the one or more conductive plugs 104 can extend across a portion of the width (e.g., along the "X" axis of the microfluidic channel 108. Example materials that can be comprised within the one or more conductive plugs 104 can include, but are not limited to: titanium nitride, tungsten, tungsten coated with tungsten oxide, a combination thereof, and/or the like.

As shown in FIG. 1A, the one or more conductive plugs 104 can extend through a chip wall 118 that defines the one or more microfluidic channels 108 to be positioned within the one or more microfluidic channels 108 (e.g., as delineated by dotted lines in FIG. 1A). For example, the one or more conductive plugs 104 can extend from a reference fluid holding chamber 102, through the chip wall 118, and into the microfluidic channel 108; wherein the chip wall 118 can separate the microfluidic channel 108 from the reference fluid holding chamber 102 such that the separate the microfluidic channel 108 is in fluid isolation from the reference fluid holding chamber 102 (e.g., as show in FIG. 1A). During operation of the microfluidic chip 100, the one or more sample fluids can contact the one or more conductive plugs 104 while flowing through the one or more microfluidic channels 108.

In one or more embodiments, at least a portion of the one or more reference electrodes 106 can be positioned within the reference fluid holding chamber 102. For example, the one or more reference electrodes 106 can extend through one or more chip walls 118 (e.g., as delineated by dotted lines in FIG. 1A) and into the reference fluid holding chamber 102 (e.g., as shown in FIG. 1A). Additionally, in various embodiments the one or more reference electrodes 106 can extend to one or more reference contact pads 122; which can be comprised of the same material as the one or more reference electrodes 106 and/or can be positioned on the microfluidic chip 100 (e.g., as shown in FIG. 1A). In one or more embodiments, the one or more reference electrodes 106 can extend to one or more transducers (e.g., positioned on or off the microfluidic chip 100). Example materials that can be comprised within the one or more reference electrodes 106 can include, but are not limited to: titanium nitride, tungsten, tungsten coated with tungsten oxide, a combination thereof, and/or the like. One of ordinary skill in the art will recognize that the layout and/or dimensions of the one or more reference electrodes 106 can vary depending on the function of the microfluidic chip 100.

In various embodiments, the reference fluid holding chamber 102 can house at least a portion of the one or more reference electrode 106, conductive plug 104, and/or one or more reference fluids 124. The reference fluid holding chamber 102 can be defined by one or more chip walls 118. Further, at least one of the chip walls 118 defining the reference fluid holding chamber 102 can separate and/or isolate the reference fluid holding chamber 102 from the one or more microfluidic channels 108.

One of ordinary skill in the art will recognize that the shape and/or dimensions of the reference fluid holding chamber 102 can vary depending on the function of the microfluidic chip 100. For example, while FIG. 1A depicts a reference fluid holding chamber 102 having a rectangular shape, reference fluid holding chambers 102 having other geometric footprints are also envisaged. For instance, the one or more reference fluid holding chambers 102 can be circular and/or cylindrical. Example fluids that can be comprised within the one or more reference fluids 124 stored within the one or more reference fluid holding chambers 102 can include, but are not limited to, pH buffer solutions (e.g., pH 8 buffer solutions with sodium chloride), and/or the like. One of ordinary skill in the art will recognize that the composition of the one or more reference fluids 124 can also vary depending on the function of the microfluidic chip 100.

Figure 1B:
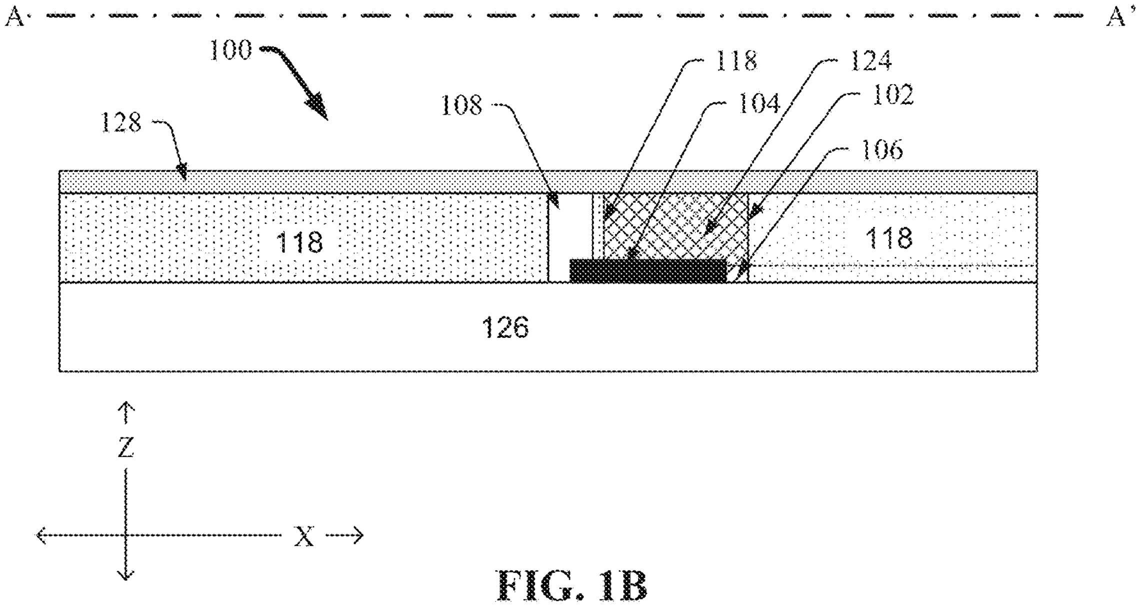
FIG. 1B illustrates a diagram of an example, non-limiting cross-sectional view of a microfluidic chip comprising one or more integrated electronic sensors in accordance with one or more embodiments described herein.

FIG. 1B illustrates a diagram of an example, non-limiting cross-sectional view of the microfluidic chip 100 comprising one or more reference electrode structures in accordance with one or more embodiments described herein. Repetitive description of like elements employed in other embodiments described herein is omitted for sake of brevity. The cross-sectional view depicted in FIG. 1B is along the A-A' plane depicted in FIG. 1A.

The one or more elements of the microfluidic chip 100 can be positioned on a substrate 126. As shown in FIG. 1B, the substrate 126 can support at least the chip walls 118, microfluidic channels 108, reference fluid holding chambers 102, conductive plug 104, and/or reference fluid 124. Further, the substrate 126 can support the one or more sensing electrodes 110, microfluidic devices 112, sensing contact pads 120, and/or reference contact pads 122. Example materials that can comprise the substrate 126 can include, but are not limited to: glass, silicon, silicon oxide, polydimethylsiloxane ("PDMS"), poly(methyl methacrylate) ("PMMA"), cyclic olefin copolymer ("COC") epoxy, a combination thereof, and/or the like.

Further, in various embodiments the microfluidic chip 100 can comprise one or more sealing layers 128 that can cover at least the one or more microfluidic channels 108, microfluidic devices 112, and/or reference fluid holding chambers 102. For clarity, the one or more sealing layers 128 are not depicted in FIG. 1A. Example materials that can be comprised within the one or more sealing layers 128 can include, but are not limited to: glass, foil, laminated film, adhesive film, tape, epoxy films, a combination thereof, and/or the like.

Figure 2:
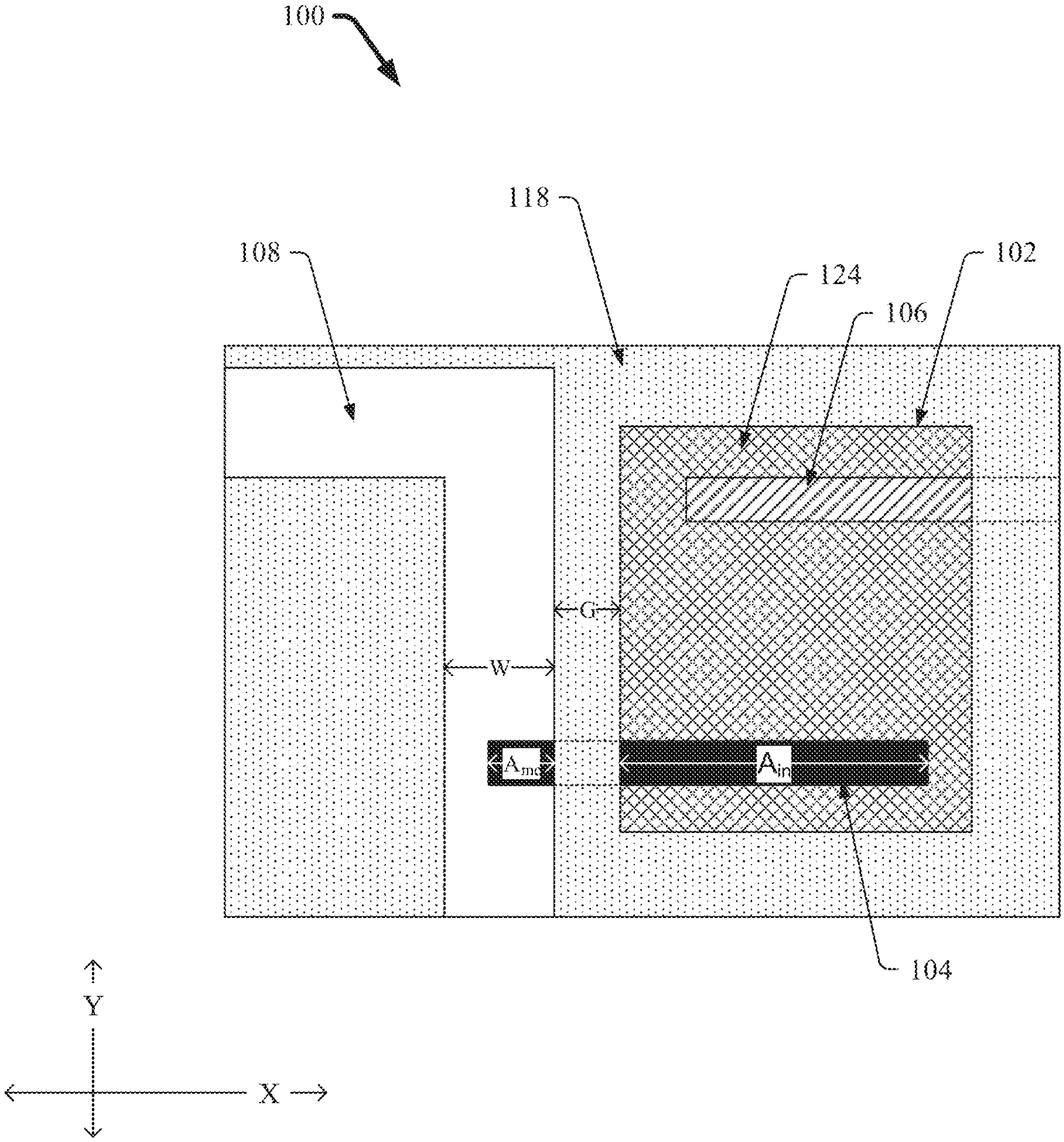
FIG. 2 illustrates a diagram of an example, non-limiting top-down view of a reference electrode structure that can be integrated within one or more microfluidic chips in accordance with one or more embodiments described herein.

FIG. 2 illustrates a diagram of an example, non-limiting top-down view of an enlarged portion of the microfluidic chip 100 in order to further depict one or more features of the one or more reference electrode structures in accordance with one or more embodiments described herein. Repetitive description of like elements employed in other embodiments described herein is omitted for sake of brevity.

As shown in FIG. 2, the chip wall 118 separating the microfluidic channel 108 from the reference fluid holding chamber 102 can have a width (e.g., along the "X" axis) delineated by the "G" arrows. In various embodiments, the chip wall 118 separating the microfluidic channel 108 from the reference fluid holding chamber 102 can have a width (e.g., along the "X" axis) ranging from, for example, greater than or equal to 10 micrometers (μm) and less than or equal to 500 μm. The microfluidic channel 108 can have a width (e.g., along the "X" axis) delineated by the "W" arrows. In various embodiments, the microfluidic channel 108 can have a width (e.g., along the "X" axis) ranging from, for example, greater than or equal to 5 μm and less than or equal to 1,000 μm (e.g., between 5 μm and 200 μm).

Also shown in FIG. 2, a first portion of the conductive plug 104 positioned within the microfluidic channel 108 can have a surface area "$A_{mc}$" delineated by the "$A_{mc}$" arrows. Further, a second portion of the conductive plug 104 positioned within the reference fluid holding chamber 102 can have a surface area "$A_{in}$" delineated by the "$A_{in}$" arrows. In one or more embodiments, $A_{mc}$ can be substantially smaller than $A_{in}$, such as in accordance with Equation 1 below.

$$\frac{A_{in}}{A_{mc}} > 1000 \tag{1}$$

Figure 3A:
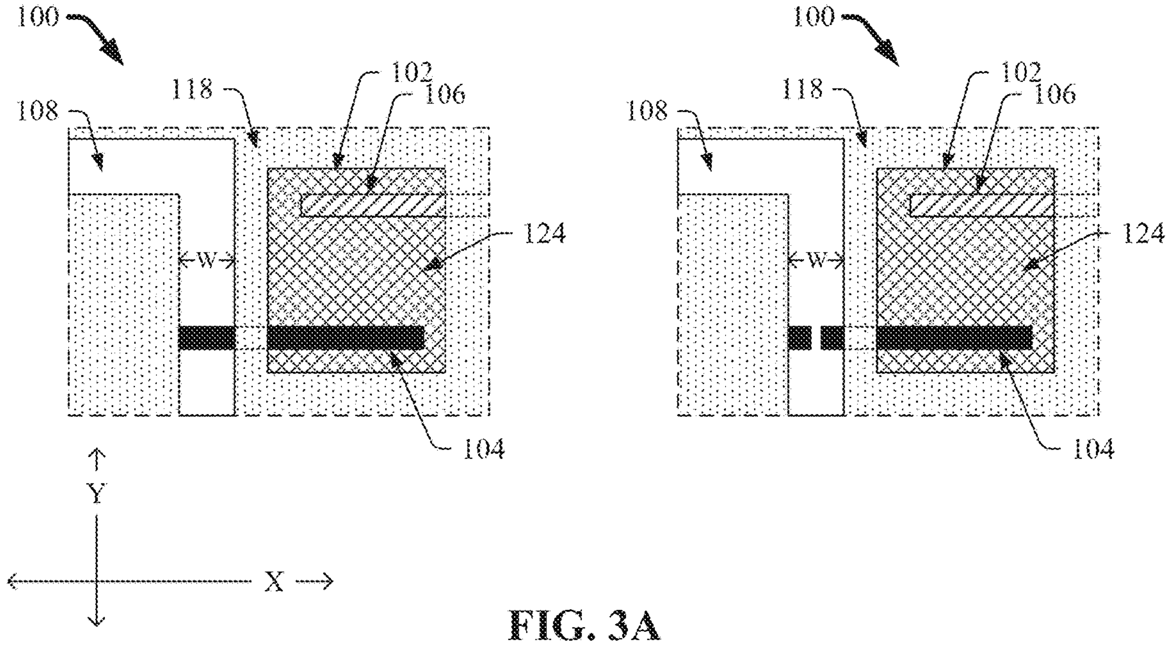
FIG. 3A illustrates diagrams of example, non-limiting top-down views of reference electrode structures that can be integrated within one or more microfluidic chips in accordance with one or more embodiments described herein.

FIG. 3A illustrates diagrams of example, non-limiting top-down views of various embodiments of reference electrode structures that can be comprised within the microfluidic chip 100 in accordance with one or more embodiments described herein. Repetitive description of like elements employed in other embodiments described herein is omitted for sake of brevity. As shown in FIG. 3A, the structure of the portion of the conductive plug 104 within the microfluidic channel 108 can vary. For instance, in one or more embodiments the conductive plug 104 can extend across the entire, or near entire, width "W" of the microfluidic channel 108 (e.g., as shown in the left diagram of FIG. 3A). In another instance, in one or more embodiments the conductive plug 104 can extend across sections of the width "W" of the microfluidic channel 108 (e.g., as shown in the left diagram of FIG. 3A). In various embodiments, the positioning of the conductive plug 104 within the microfluidic channel 108 can alter the flow of the one or more sample fluids flowing through the microfluidic channel 108.

Figure 3B:
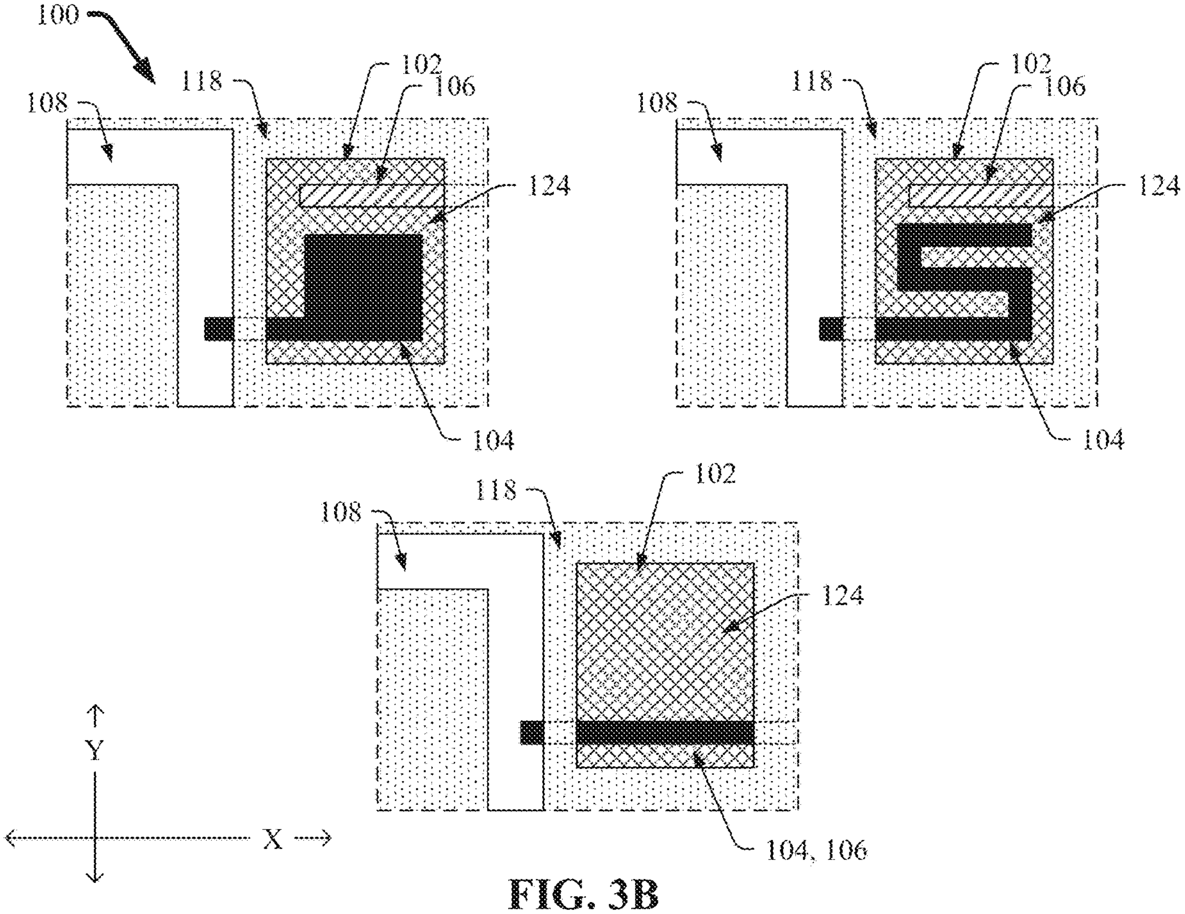
FIG. 3B illustrates diagrams of example, non-limiting top-down views of reference electrode structures that can be integrated within one or more microfluidic chips in accordance with one or more embodiments described herein.

FIG. 3B illustrates diagrams of example, non-limiting top-down views of various embodiments of reference electrode structures that can be comprised within the microfluidic chip 100 in accordance with one or more embodiments described herein. Repetitive description of like elements employed in other embodiments described herein is omitted for sake of brevity. As shown in FIG. 3B, the structure of the portion of the conductive plug 104 within the reference fluid holding chamber 102 can vary. In various embodiments, the structure of the portion of the conductive plug 104 within the reference fluid holding chamber 102 can vary to achieve a desired surface area "$A_{in}$".

For example, the structure of the portion of the conductive plug 104 within the reference fluid holding chamber 102 can be characterized by a circular, polygonal, and/or serpentine shape (e.g., as shown in the diagrams of FIG. 3B). Additionally, in one or more embodiments, the conductive plug 104 and the reference electrode 106 can be comprised of the same material and can be single integral structure that extends through one or more first chip walls 118 into the reference fluid holding chamber 102, and through one or more second chip walls 118 into the microfluidic channel 108 (e.g., as shown in the bottom diagram of FIG. 3B).

Figure 4A:
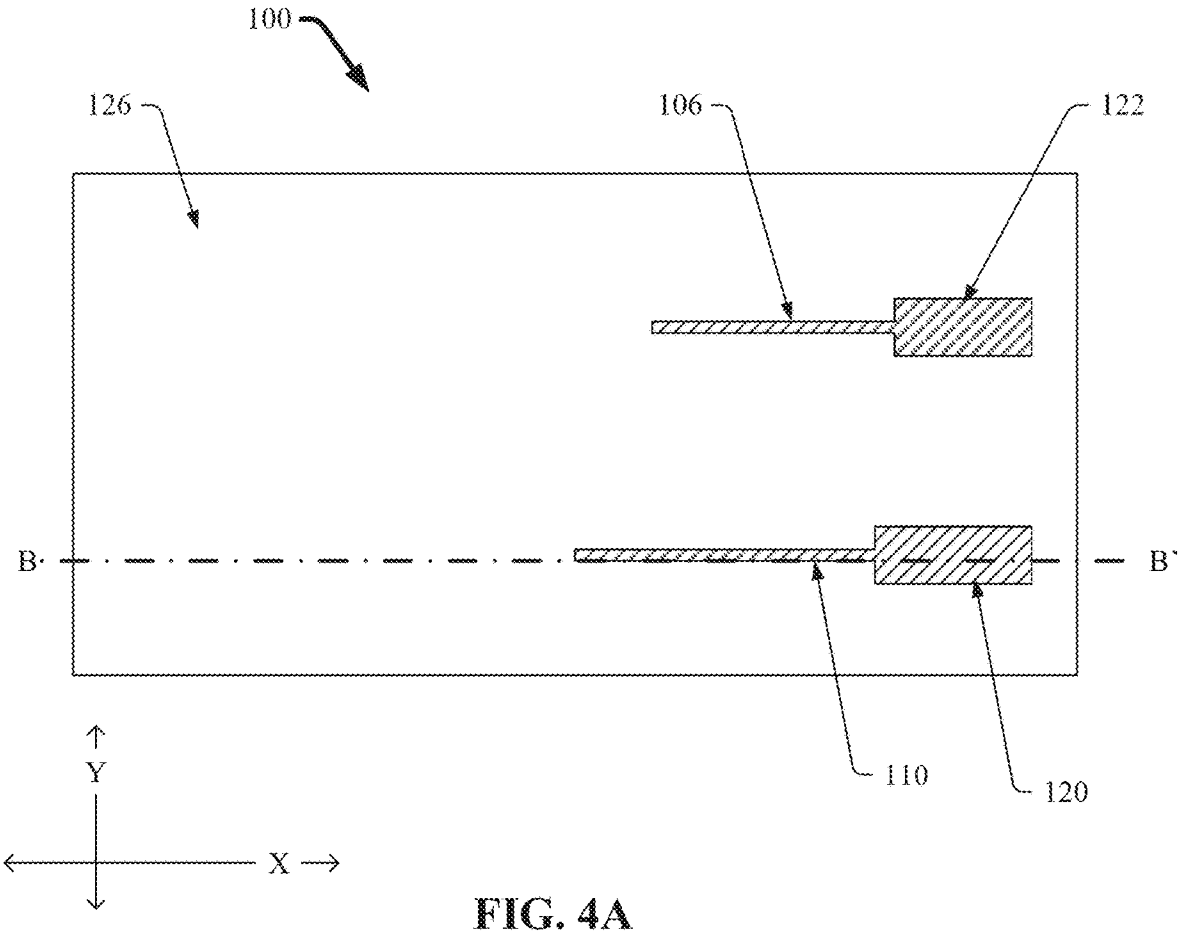
FIG. 4A illustrates a diagram of an example, non-limiting top-down view of a microfluidic chip comprising one or more integrated electronic sensors during a first stage of manufacturing in accordance with one or more embodiments described herein.
Figure 4B:
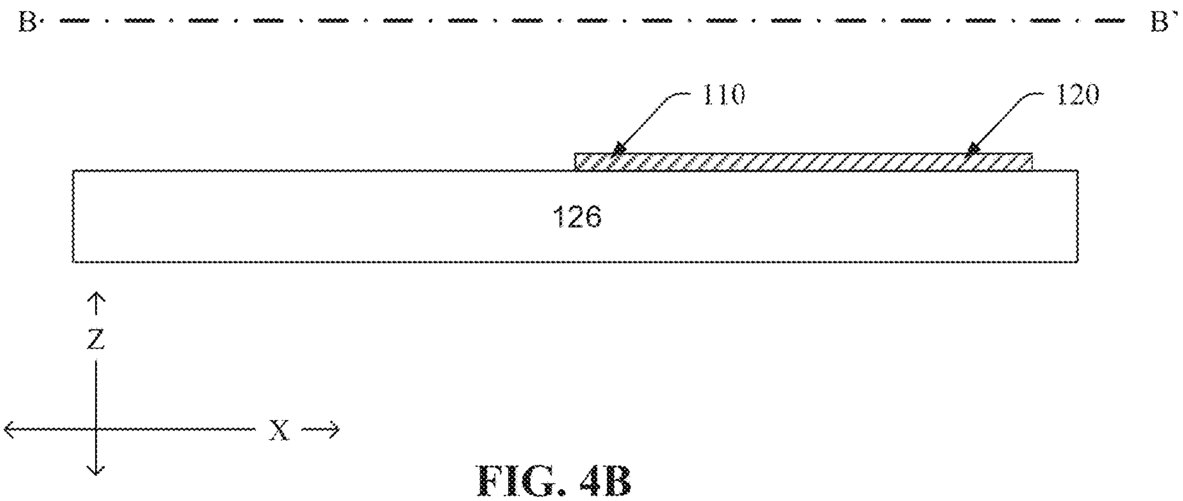
FIG. 4B illustrates a diagram of an example, non-limiting cross-sectional view of a microfluidic chip comprising one or more integrated electronic sensors during a first stage of manufacturing in accordance with one or more embodiments described herein.

FIGS. 4A-4B illustrate diagrams of an example, non-limiting microfluidic chip 100 comprising one or more integrated electronic sensors during a first stage of manufacturing in accordance with one or more embodiments described herein. Repetitive description of like elements employed in other embodiments described herein is omitted for sake of brevity. FIG. 4A depicts a top-down view of the microfluidic chip 100 during the first stage of manufacturing, and FIG. 4B depicts a cross-sectional view of the microfluidic chip 100 during the first stage of manufacturing. During the first stage of manufacturing, the one or more reference electrodes 106, sensing electrodes 110, reference contact pads 122, and/or sensing contact pads 120 can be deposited onto the substrate 126.

In various embodiments, the one or more reference electrodes 106, sensing electrodes 110, reference contact pads 122, and/or sensing contact pads 120 can be deposited on the substrate 126 via one or more deposition processes. For example, the one or more reference electrodes 106, sensing electrodes 110, reference contact pads 122, and/or sensing contact pads 120 can be deposited via one or more additive techniques, such as one or more patterning processes, screen-printing processes, deposition processes of conductive inks, and/or lift-off processes.

Figure 5A:
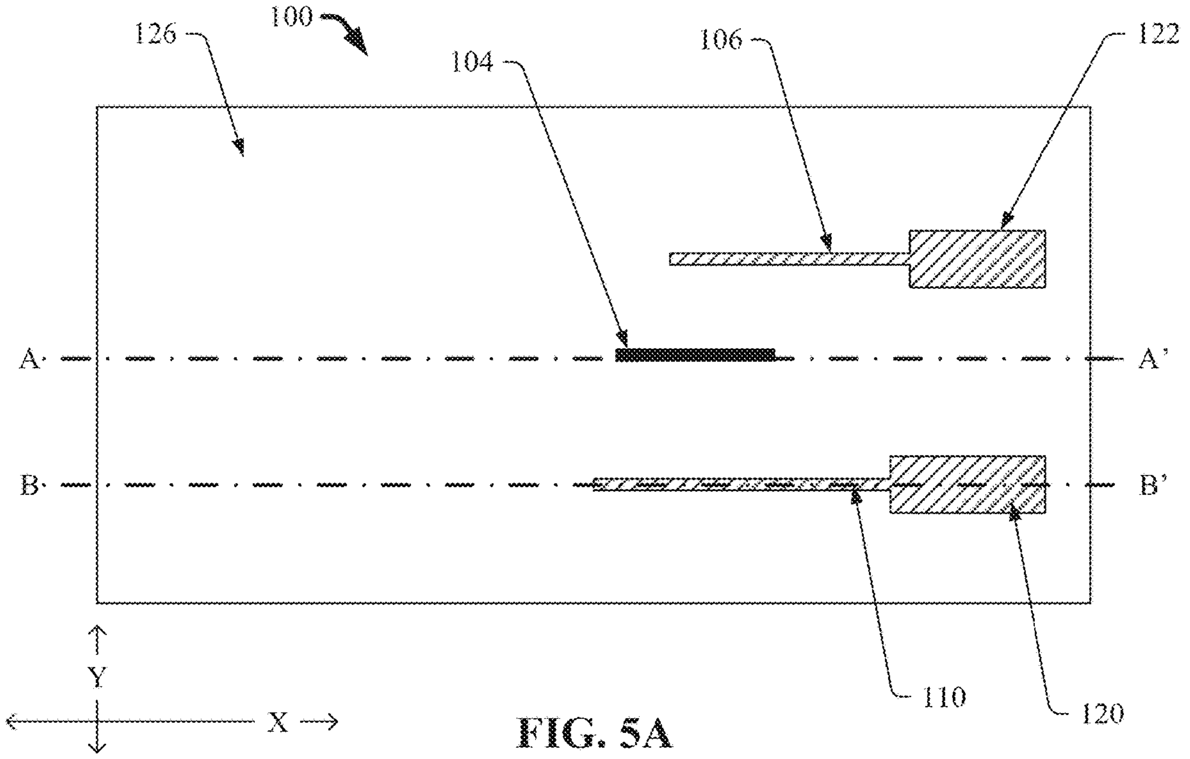
FIG. 5A illustrates a diagram of an example, non-limiting top-down view of a microfluidic chip comprising one or more integrated electronic sensors during a second stage of manufacturing in accordance with one or more embodiments described herein.
Figure 5B:
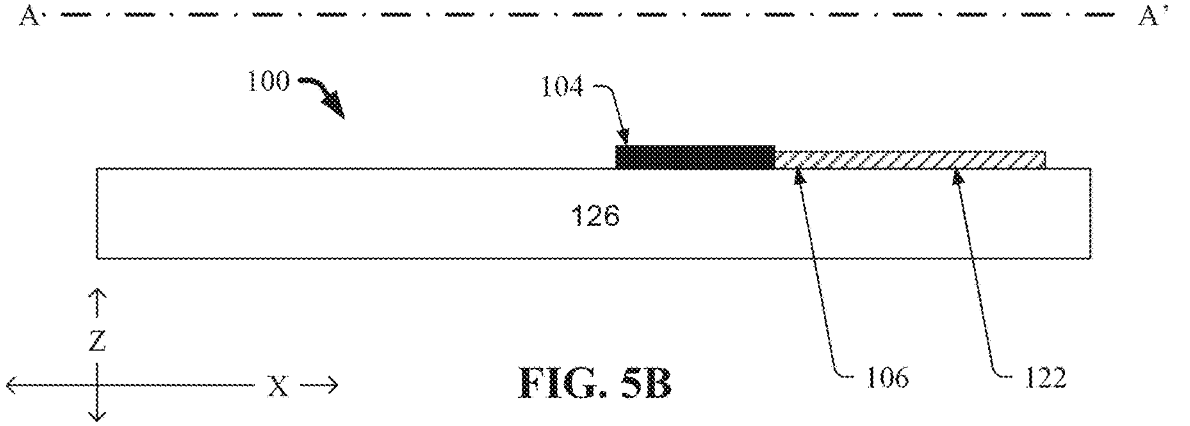
FIG. 5B illustrates a diagram of an example, non-limiting cross-sectional view of a microfluidic chip comprising one or more integrated electronic sensors during a second stage of manufacturing in accordance with one or more embodiments described herein.
Figure 5C:
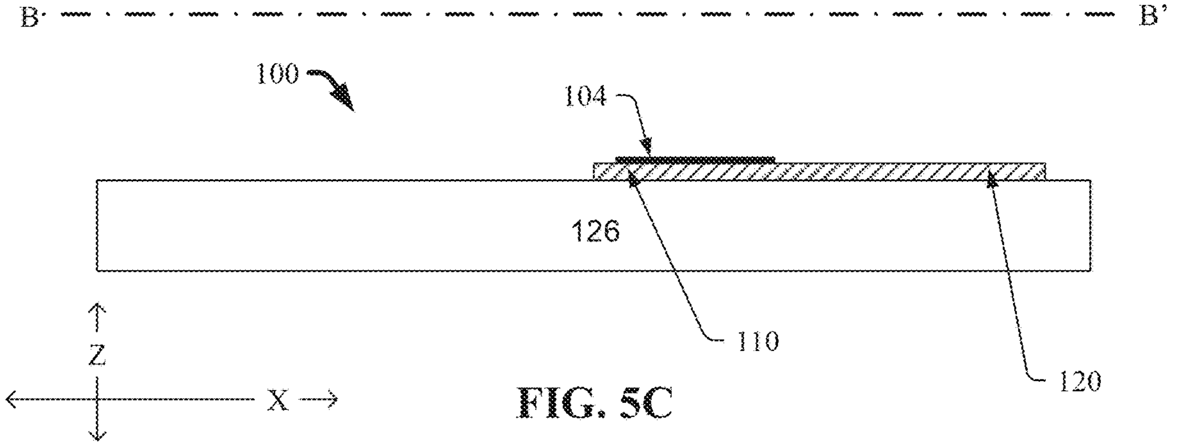
FIG. 5C illustrates a diagram of an example, non-limiting cross-sectional view of a microfluidic chip comprising one or more integrated electronic sensors during a second stage of manufacturing in accordance with one or more embodiments described herein.

FIGS. 5A-5C illustrate diagrams of an example, non-limiting microfluidic chip 100 comprising one or more integrated electronic sensors during a second stage of manufacturing in accordance with one or more embodiments described herein. Repetitive description of like elements employed in other embodiments described herein is omitted for sake of brevity. FIG. 5A depicts a top-down view of the microfluidic chip 100 during the second stage of manufacturing. FIG. 5B depicts a cross-sectional view of the microfluidic chip 100 along the A-A' plane during the second stage of manufacturing. FIG. 5C depicts a cross-sectional view of the microfluidic chip 100 along the B-B' plane during the second stage of manufacturing. During the second stage of manufacturing, the one or more conductive plugs 104 can be deposited onto the substrate 126.

In various embodiments, the one or more conductive plugs 104 can be deposited on the substrate 126 via one or more deposition processes. For example, the one or more conductive plugs 104 can be deposited via one or more additive techniques, such as one or more patterning processes, screen-printing processes, deposition processes of conductive inks, and/or lift-off processes.

Figure 6A:
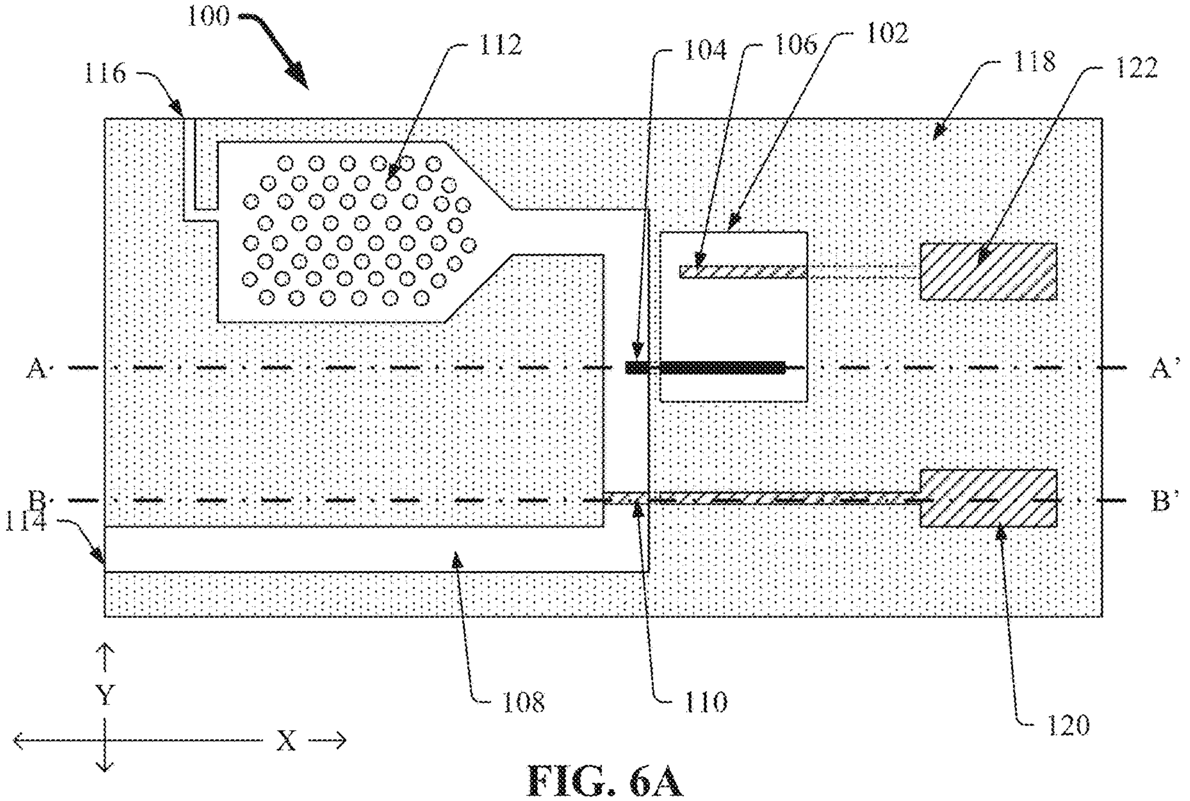
FIG. 6A illustrates a diagram of an example, non-limiting top-down view of a microfluidic chip comprising one or more integrated electronic sensors during a third stage of manufacturing in accordance with one or more embodiments described herein.
Figure 6B:
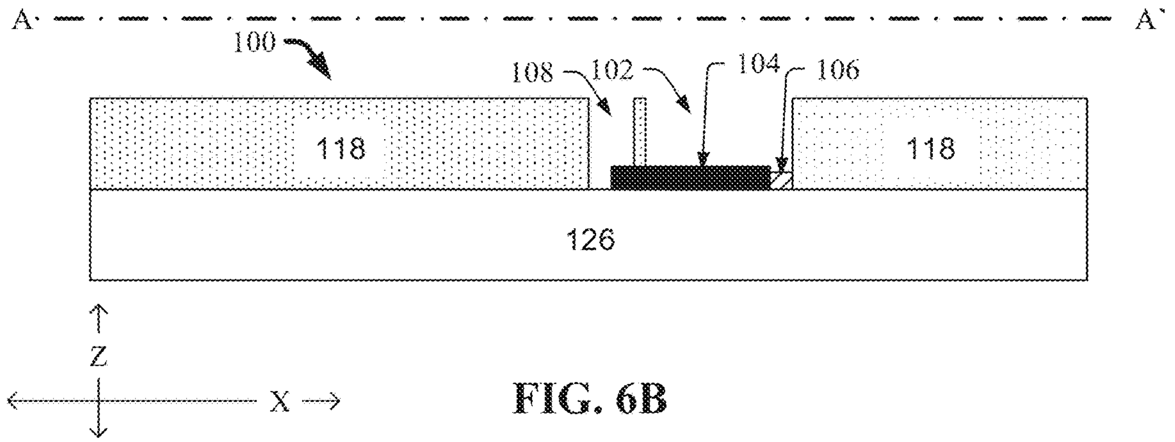
FIG. 6B illustrates a diagram of an example, non-limiting cross-sectional view of a microfluidic chip comprising one or more integrated electronic sensors during a third stage of manufacturing in accordance with one or more embodiments described herein.
Figure 6C:
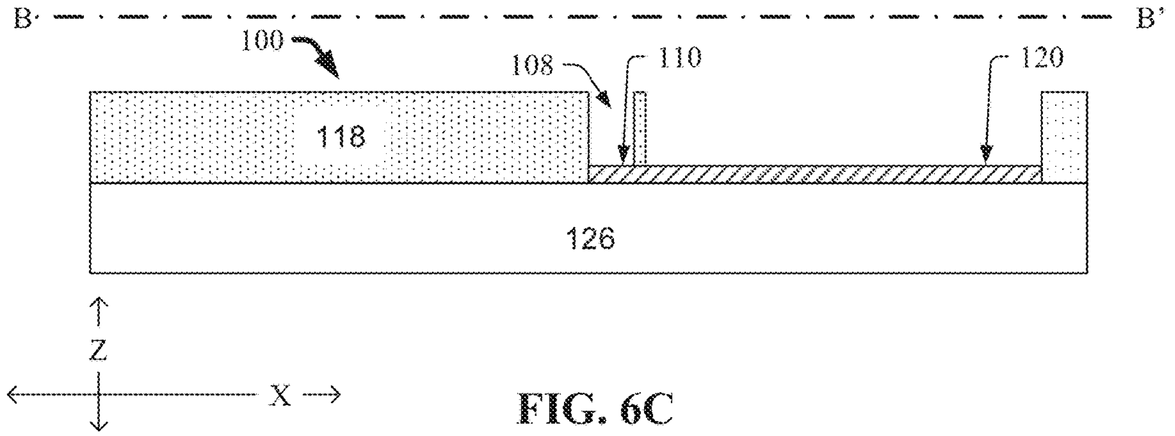
FIG. 6C illustrates a diagram of an example, non-limiting cross-sectional view of a microfluidic chip comprising one or more integrated electronic sensors during a third stage of manufacturing in accordance with one or more embodiments described herein.

FIGS. 6A-6C illustrate diagrams of an example, non-limiting microfluidic chip 100 comprising one or more integrated electronic sensors during a third stage of manufacturing in accordance with one or more embodiments described herein. Repetitive description of like elements employed in other embodiments described herein is omitted for sake of brevity. FIG. 6A depicts a top-down view of the microfluidic chip 100 during the third stage of manufacturing. FIG. 6B depicts a cross-sectional view of the microfluidic chip 100 along the A-A' plane during the third stage of manufacturing. FIG. 6C depicts a cross-sectional view of the microfluidic chip 100 along the B-B' plane during the third stage of manufacturing. During the third stage of manufacturing, the one or more chip walls 118 can be deposited onto the substrate 126 to define the one or more microfluidic channels 108, microfluidic devices 112, and/or reference fluid holding chambers 102.

In various embodiments, the one or more chip walls 118 can be deposited onto the substrate 126 via one or more deposition processes. For example, the one or more chip walls 118 can be deposited via one or more additive or subtractive techniques, such as one or more patterning of photoresist layers (e.g., SU-8 layers) or laminated dry film resist layers, or etching the substrate 126 using one or more wet or dry etching processes. For instance, the one or more chip walls 118 can be patterned onto the substrate 126 such that the one or more microfluidic channels 108, microfluidic devices 112, and/or reference fluid holding chambers 102 can be formed via one or more additive deposition processes.

Figure 7A:
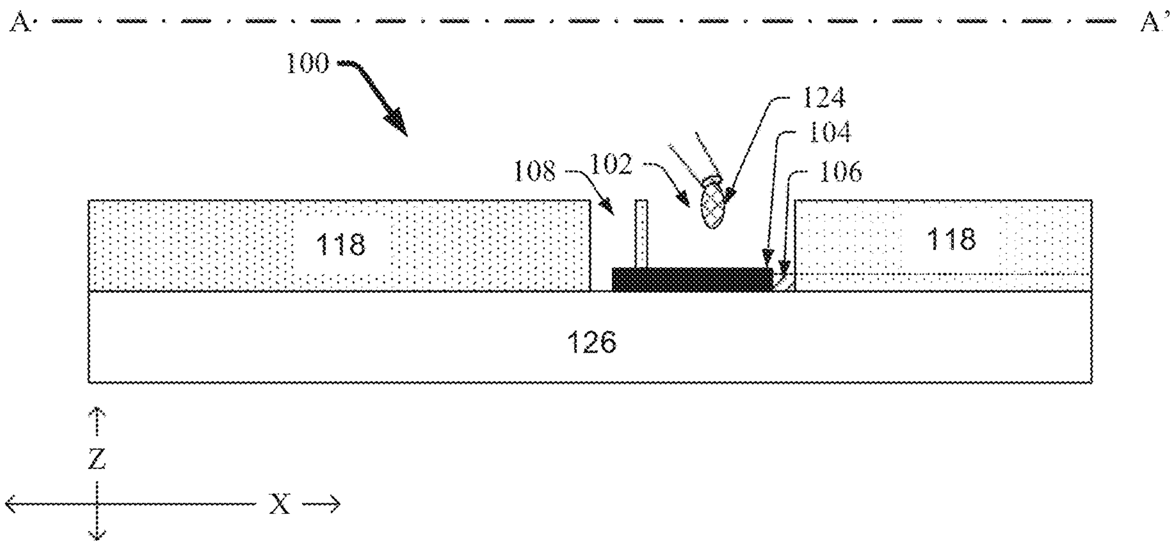
FIG. 7A illustrates a diagram of an example, non-limiting cross-sectional view of a microfluidic chip comprising one or more integrated electronic sensors during a fluid loading process in accordance with one or more embodiments described herein.

FIGS. 7A and/or 7B illustrate diagrams of example, non-limiting cross-sectional views of the microfluidic chip 100 comprising one or more integrated electronic sensors during a fluid loading process in accordance with one or more embodiments described herein. Repetitive description of like elements employed in other embodiments described herein is omitted for sake of brevity. In various embodiments, the fluid loading process can be an extension to the stages of manufacturing depicted in FIGS. 4A-6C, and/or can be performed by a user of the microfluidic chip 100 post manufacturing.

Figure 7B:
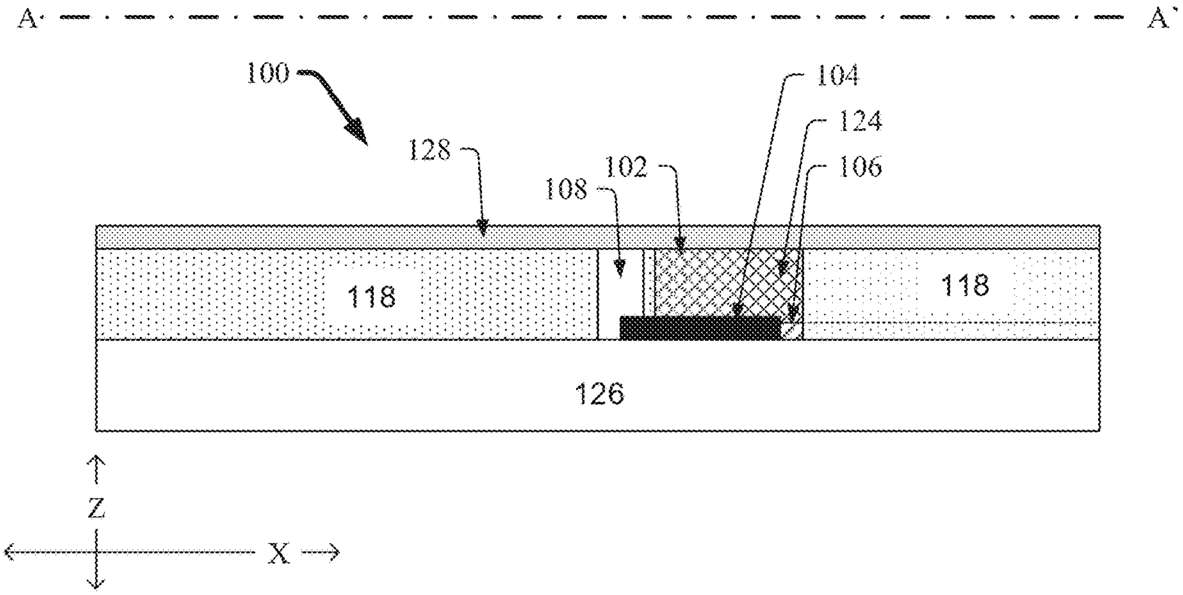
FIG. 7B illustrates a diagram of an example, non-limiting cross-sectional view of a microfluidic chip comprising one or more integrated electronic sensors during a fluid loading process in accordance with one or more embodiments described herein.

As shown in FIG. 7A, subsequent to the formation of the one or more reference fluid holding chambers 102 during the third stage of manufacturing, the one or more reference fluids 124 can be supplied to the one or more reference fluid holding chambers 102. For example, the one or more reference fluids 124 can be deposited into the one or more reference fluid holding chambers 102 via the top surface of the microfluidic chip 100 (e.g., as shown in FIG. 7A). FIG. 7B further shows that the one or more sealing layers 128 can be positioned over the one or more reference fluid holding chambers 102, and/or microfluidic channels 108, after supplying the one or more reference fluids 124.

Figure 8A:
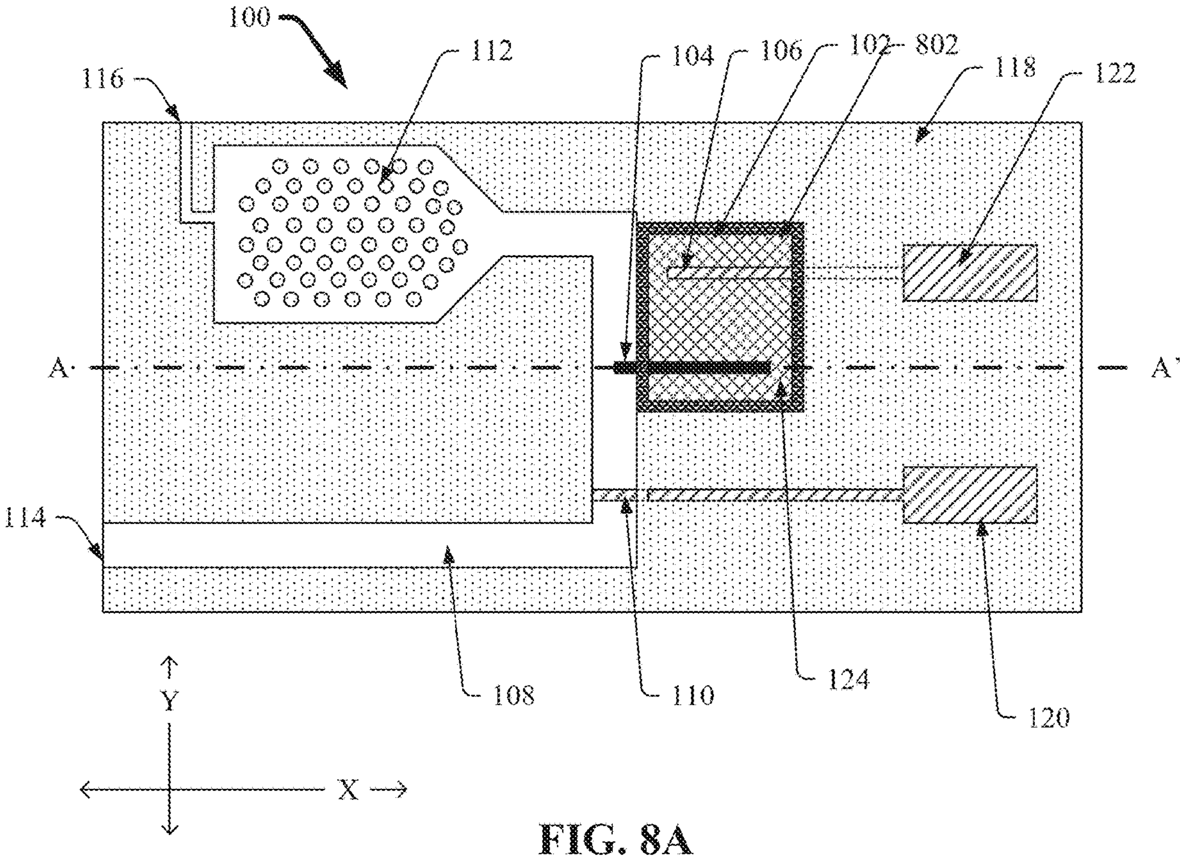
FIG. 8A illustrates a diagram of an example, non-limiting top-down view of a microfluidic chip comprising one or more integrated electronic sensors and/or reference fluid reservoirs in accordance with one or more embodiments described herein.

FIG. 8A illustrates a diagram of an example, non-limiting top-down view of the microfluidic chip 100 comprising a reference fluid holding chamber 102 that is in fluid communication with a reference fluid reservoir 802 in accordance with one or more embodiments described herein. Repetitive description of like elements employed in other embodiments described herein is omitted for sake of brevity. In one or more embodiments, one or more reference fluid reservoirs 802 can be fixed to the reference fluid holding chamber 102 (e.g., as shown in FIG. 8A). For example, the one or more reference fluid reservoirs 802 can be positioned over the one or more reference fluid holding chambers 102.

Figure 8B:
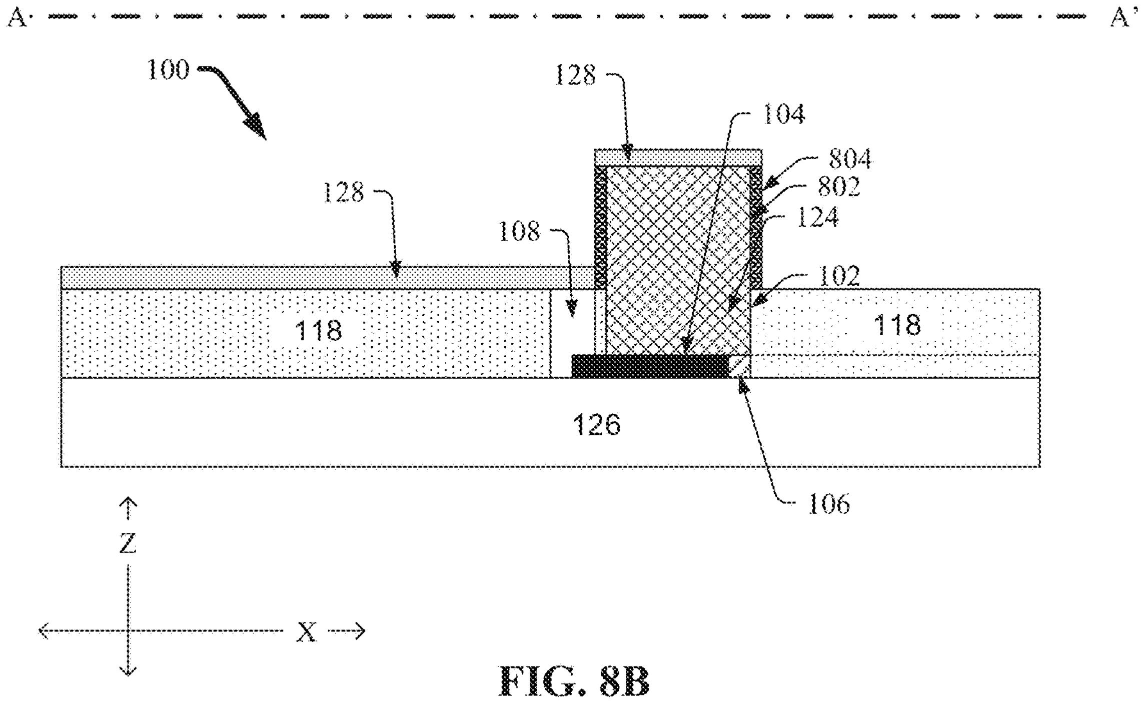
FIG. 8B illustrates a diagram of an example, non-limiting cross-sectional view of a microfluidic chip comprising one or more integrated electronic sensors and/or reference fluid reservoirs in accordance with one or more embodiments described herein.

FIG. 8B illustrates a diagram of an example, non-limiting cross-sectional view of the microfluidic chip 100 comprising a reference fluid holding chamber 102 that is in fluid communication with a reference fluid reservoir 802 in accordance with one or more embodiments described herein. Repetitive description of like elements employed in other embodiments described herein is omitted for sake of brevity. As shown in FIG. 8B, the one or more reference fluid reservoirs 802 can be aligned with the one or more reference fluid holding chambers 102 along the "Z" axis.

In one or more embodiments, the one or more reference fluid reservoirs 802 can increase the volume of reference fluid 124 that can be held by the microfluidic chip 100 and/or can be accessible to the one or more reference fluid holding chambers 102. For example, the one or more reference fluid reservoirs 802 can be defined by one or more reservoir walls 804 positioned on the one or more chip walls 118 that define the one or more reference fluid holding chambers 102. Example materials that can comprise the one or more reservoir walls 804 can include, but are not limited to: plastics, elastomers, metallic materials, a combination thereof, and/or the like.

Figure 9:
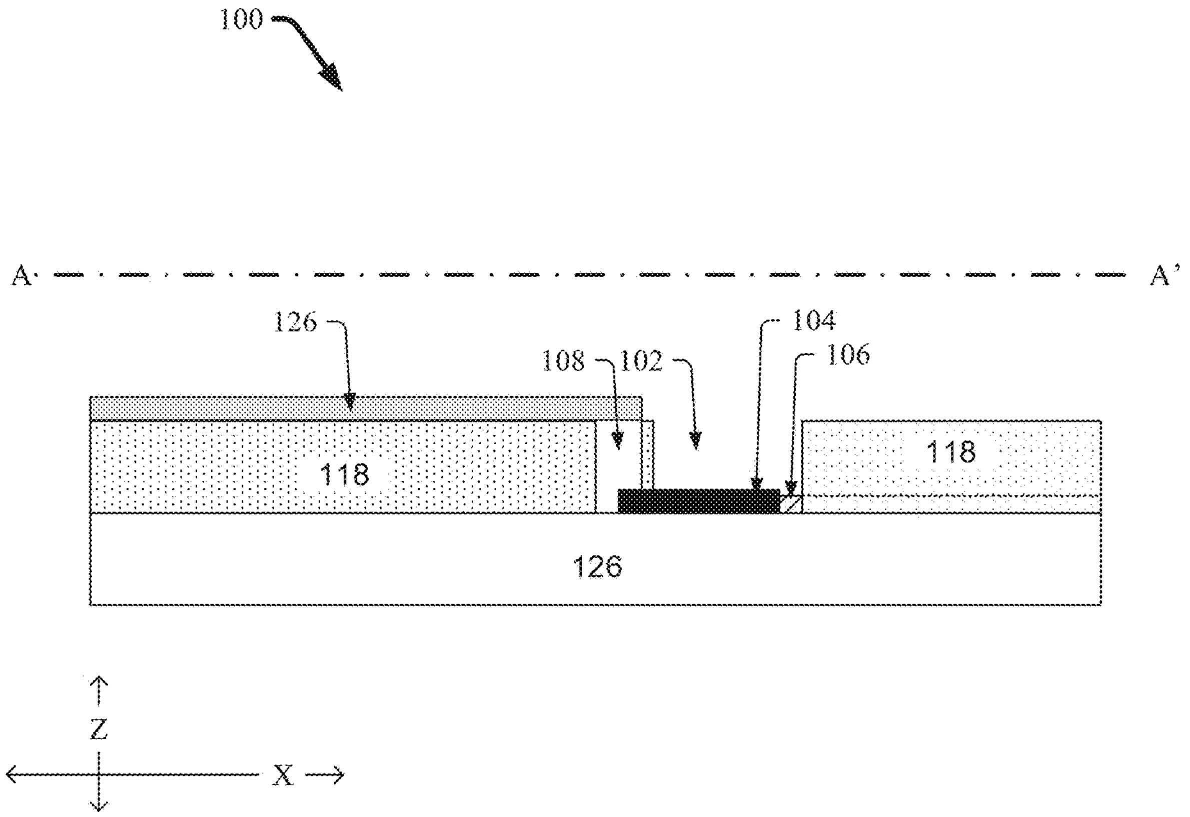
FIG. 9 illustrates a diagram of an example, non-limiting cross-sectional view of a microfluidic chip comprising one or more integrated electronic sensors and/or reference fluid reservoirs during a fourth stage of manufacturing in accordance with one or more embodiments described herein.

FIG. 9 illustrates a diagram of an example, non-limiting cross-sectional view of the microfluidic chip 100 comprising one or more reference fluid reservoirs 802 during a fourth stage of manufacturing in accordance with one or more embodiments described herein. Repetitive description of like elements employed in other embodiments described herein is omitted for sake of brevity. In various embodiments, the microfluidic chip 100 can be formed in accordance with the first three stages of manufacturing depicted in FIGS. 4A-6C. Subsequent to the third stage of manufacturing, the fourth stage of manufacturing can include depositing one or more sealing layers 128 over the one or more microfluidic channels 108. As shown in FIG. 9, the one or more microfluidic channels 108 can be covered by the one or more sealing layers 128 during the fourth stage of manufacturing. The one or more reference fluid holding chambers 102 can remain uncovered during the fourth stage of manufacturing.

Figure 10A:
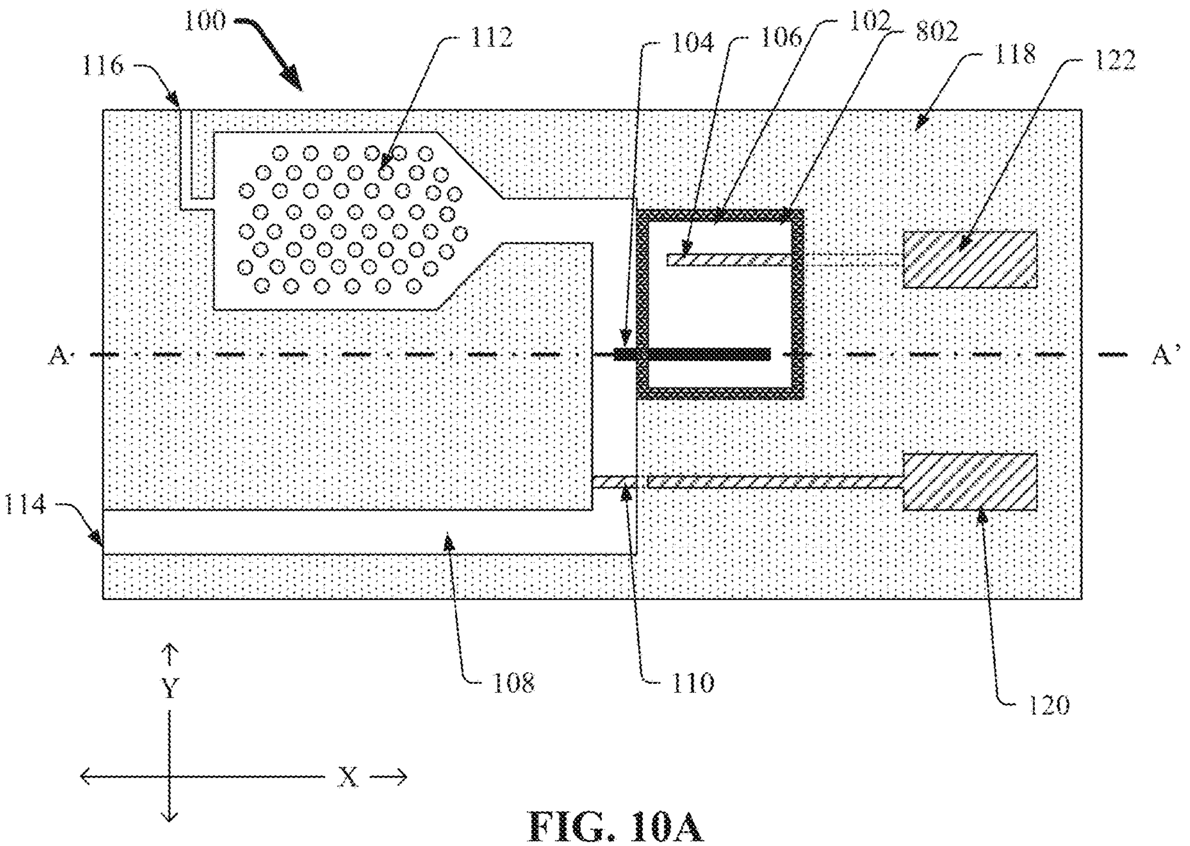
FIG. 10A illustrates a diagram of an example, non-limiting top-down view of a microfluidic chip comprising one or more integrated electronic sensors and/or reference fluid reservoirs during a fifth stage of manufacturing in accordance with one or more embodiments described herein.
Figure 10B:
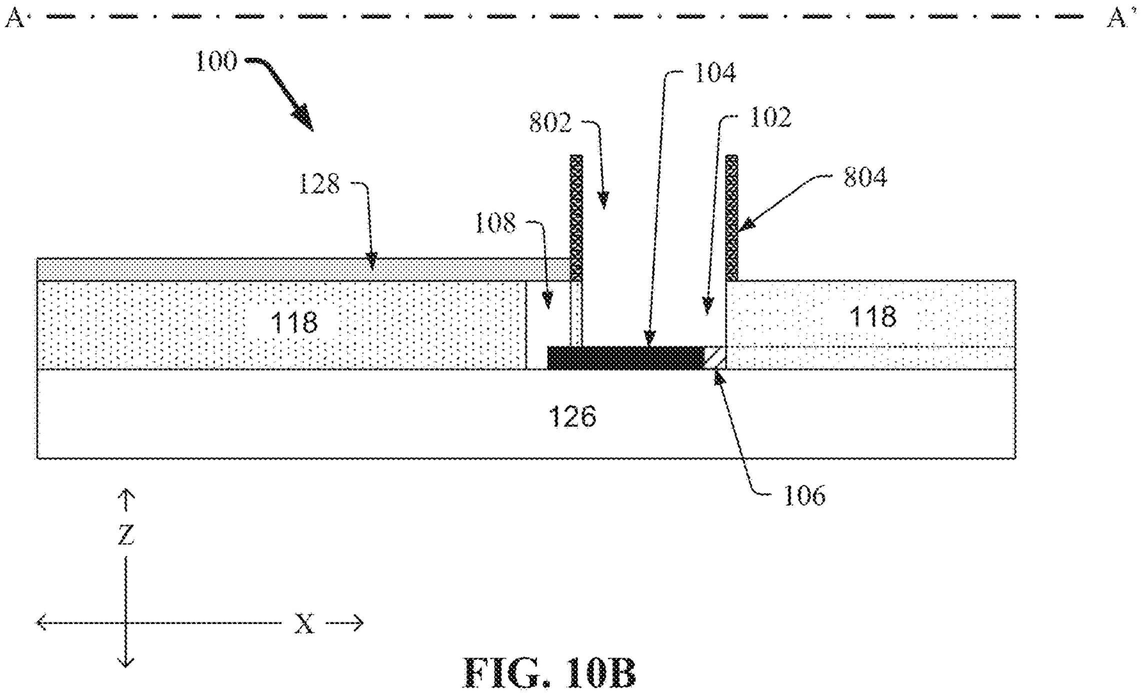
FIG. 10B illustrates a diagram of an example, non-limiting cross-sectional view of a microfluidic chip comprising one or more integrated electronic sensors and/or reference fluid reservoirs during a fifth stage of manufacturing in accordance with one or more embodiments described herein.

FIGS. 10A and/or 10B illustrate diagrams of the example, non-limiting microfluidic chip 100 comprising one or more reference fluid reservoirs 802 during a fifth stage of manufacturing in accordance with one or more embodiments described herein. Repetitive description of like elements employed in other embodiments described herein is omitted for sake of brevity. FIG. 10A depicts a top-down view of the microfluidic chip 100 comprising the one or more reference fluid reservoirs 802 during the fifth stage of manufacturing. FIG. 10B depicts a cross-sectional view of the microfluidic chip 100 comprising the one or more reference fluid reservoirs 802 during the fifth stage of manufacturing. During the fifth stage of manufacturing, one or more reservoir walls 804 can be deposited onto one or more chip walls 118 to define the one or more reference fluid reservoirs 802.

The one or more reservoir walls 804 can be deposited via one or more deposition processes and/or additive techniques. For example, the one or more reservoir walls 804 can be adhered to the one or more chip walls 118. In another example, the one or more reservoir walls 804 can be formed on the one or more chip walls 118 via three-dimensional printing. One of ordinary skill in the art will recognize that a height (e.g., along the "Z" axis) and/or thickness (e.g., along the "X" axis) of the one or more reservoir walls 804 can vary depending on the function of the microfluidic chip 100. For instance, as the height (e.g., along the "Z" axis) of the one or more reservoir walls 804 increases, the volume capacity of the reference fluid reservoir 802 increases; thereby enabling larger volumes of reference fluids 124 to be utilized with the one or more reference electrode structures.

Figure 11A:
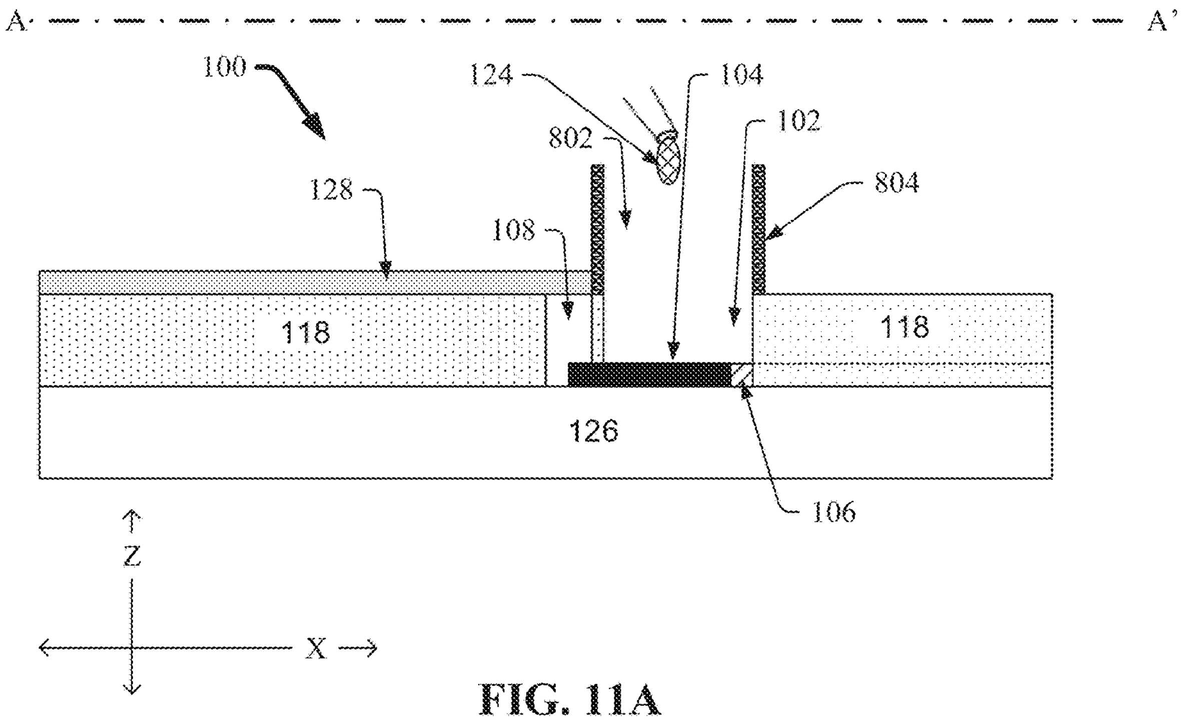
FIG. 11A illustrates a diagram of an example, non-limiting cross-sectional view of a microfluidic chip comprising one or more integrated electronic sensors and/or reference fluid reservoirs during a fluid loading process in accordance with one or more embodiments described herein.

FIGS. 11A and/or 11B illustrate diagrams of example, non-limiting cross-sectional views of the microfluidic chip 100 comprising one or more reference fluid reservoirs 802 during a fluid loading process in accordance with one or more embodiments described herein. Repetitive description of like elements employed in other embodiments described herein is omitted for sake of brevity. In various embodiments, the fluid loading process can be an extension to the stages of manufacturing depicted in FIGS. 4A-6C and 9-10B, and/or can be performed by a user of the microfluidic chip 100 post manufacturing.

Figure 11B:
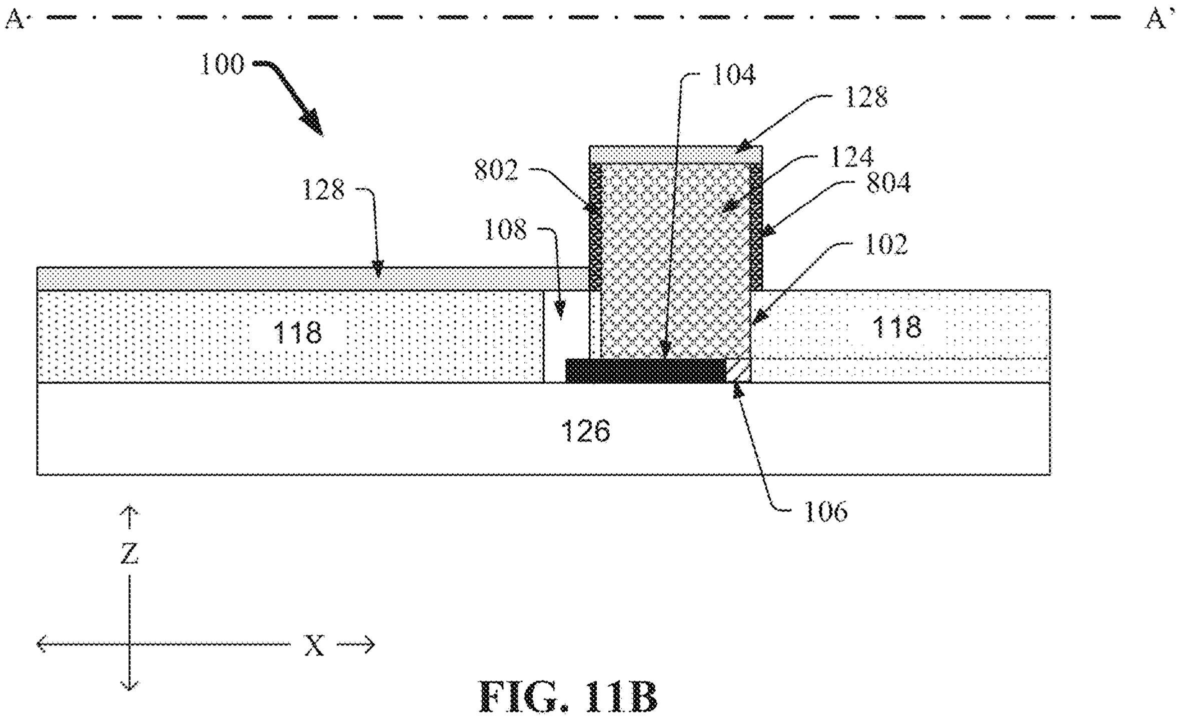
FIG. 11B illustrates a diagram of an example, non-limiting cross-sectional view of a microfluidic chip comprising one or more integrated electronic sensors and/or reference fluid reservoirs during a fluid loading process in accordance with one or more embodiments described herein.

As shown in FIG. 11A, subsequent to the formation of the one or more reference fluid reservoirs 802 during the fifth stage of manufacturing, the one or more reference fluids 124 can be supplied to the one or more reference fluid holding chambers 102 and/or reference fluid reservoirs 802. For example, the one or more reference fluids 124 can be deposited into the one or more reference fluid holding chambers 102 and/or reference fluid reservoirs 802 via the top surface of the microfluidic chip 100 (e.g., as shown in FIG. 11A). FIG. 11B further shows that one or more additional sealing layers 128 can be positioned over the one or more reference fluid reservoirs 802 after supplying the one or more reference fluids 124.

Figure 12A:
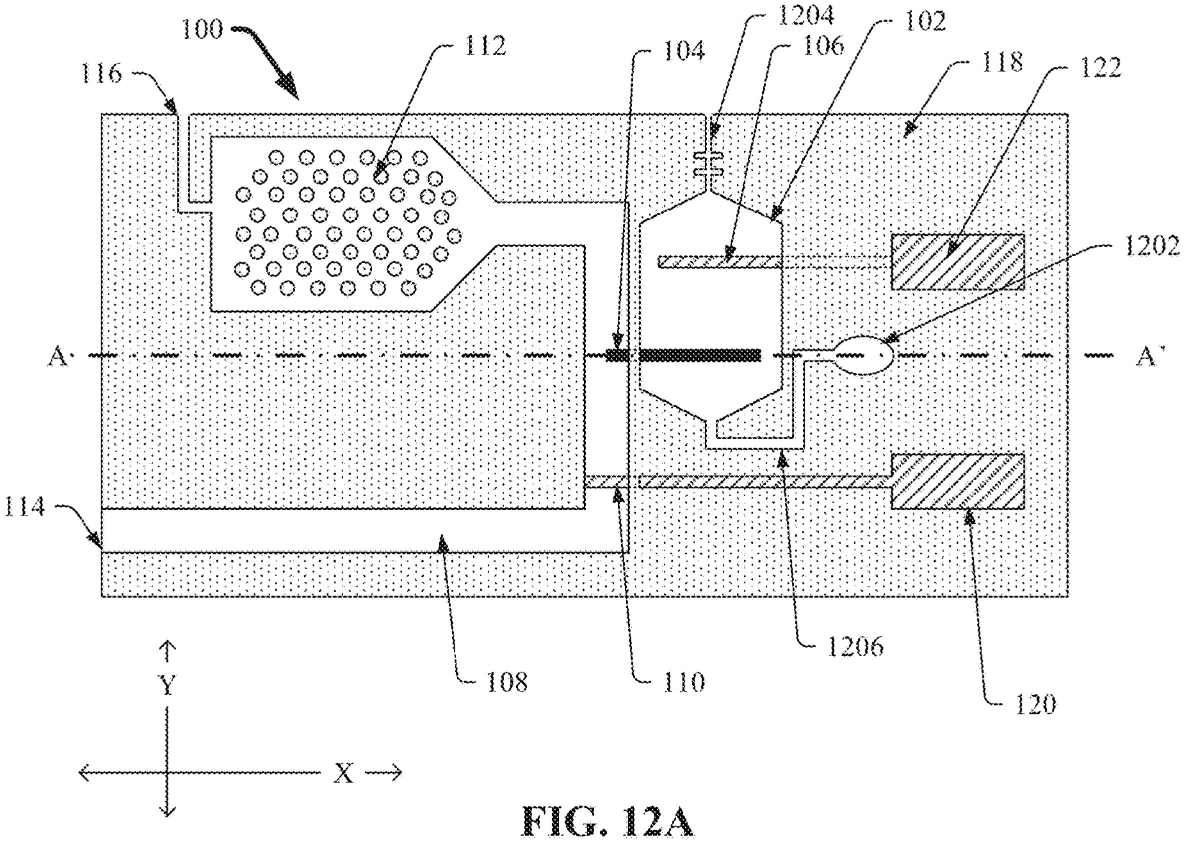
FIG. 12A illustrates a diagram of an example, non-limiting top-down view of a microfluidic chip comprising one or more integrated electronic sensors and/or reference fluid inlets in accordance with one or more embodiments described herein.

FIG. 12A illustrates a diagram of an example, non-limiting top-down view of the microfluidic chip 100 comprising a reference fluid inlet 1202 and/or an air vent 1204 in fluid communication with the one or more reference fluid holding chambers 102 in accordance with one or more embodiments described herein. Repetitive description of like elements employed in other embodiments described herein is omitted for sake of brevity. In one or more embodiments, the one or more reference fluid holding chambers 102 can be in fluid communication with one or more reference fluid inlets 1202 and/or air vents 1204.

In one or more embodiments, the one or more reference fluid inlets 1202 and/or air vents 1204 can be defined by the on more chip walls 118. As shown in FIG. 12A, the one or more reference fluid inlets 1202 can be connected to the one or more reference fluid holding chambers 102 via one or more reference fluid inlet channels 1206 (e.g., defined by the one or more chip walls 118). In various embodiments, the one or more reference fluid inlets 1202, reference fluid inlet channels 1206, and/or air vents 1204 can enable reference fluid 124 to be supplied to the one or more reference fluid holding chambers 102 subsequent to covering the one or more reference fluid holding chambers 102 with the one or sealing layers 128. For example, FIG. 12A depicts the microfluidic chip 100 in an unloaded state, wherein the microfluidic chip 100 has yet to undergo one or more fluid loading processes to introduce reference fluid 124 to the one or more reference fluid holding chambers 102.

Figure 12B:
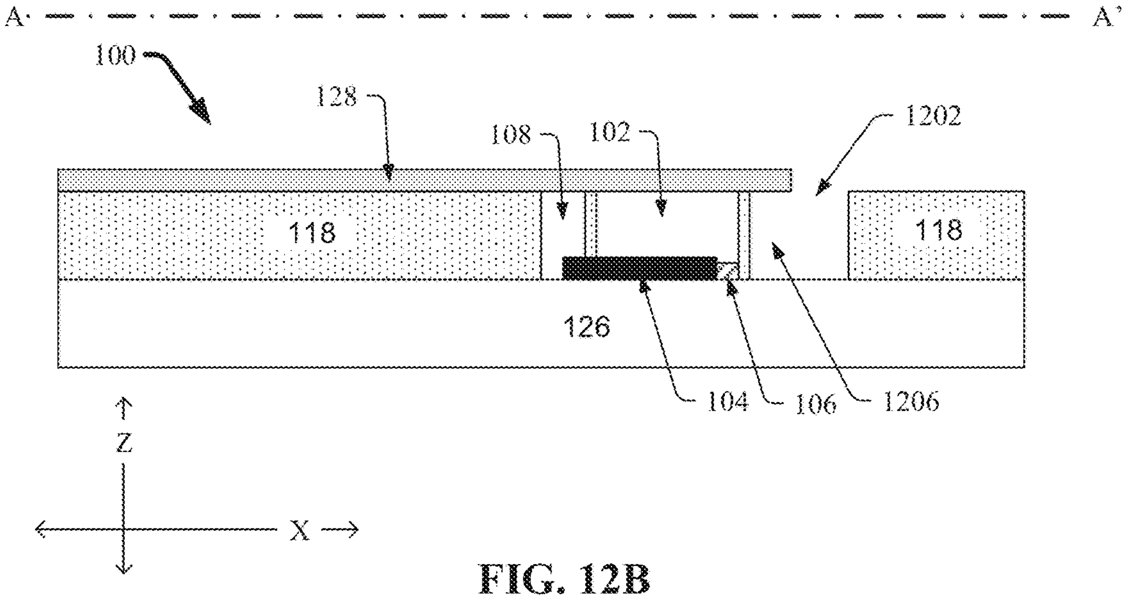
FIG. 12B illustrates a diagram of an example, non-limiting cross-sectional view of a microfluidic chip comprising one or more integrated electronic sensors and/or reference fluid inlets in accordance with one or more embodiments described herein.

FIG. 12B illustrates a diagram of an example, non-limiting cross-sectional view of the microfluidic chip 100 comprising a reference fluid inlet 1202 and/or an air vent 1204 in fluid communication with the one or more reference fluid holding chambers 102 in accordance with one or more embodiments described herein. Repetitive description of like elements employed in other embodiments described herein is omitted for sake of brevity. As shown in FIG. 12B, the one or more microfluidic channels 108 and/or reference fluid holding chambers 102 can be covered by the one or more sealing layers 128 while the microfluidic chip 100 is still in the unloaded state. Further, the one or more sealing layers 128 can extend over the one or more reference fluid inlet channels 1206 while the microfluidic chip 100 is in the unloaded state (e.g., as shown in FIG. 12B).

The one or more reference fluid inlets 1202 can remain uncovered in the unloaded state. Reference fluid 124 can be introduced into the one or more reference fluid holding chambers 102 by suppling the reference fluid 124 to the one or more reference fluid inlets 1202. Thereby, one or more capillary forces can facilitate a migration of reference fluid 124 from the one or more reference fluid inlets 1202, through the one or more reference fluid inlet channels 1206, and into the one or more reference fluid holding chambers 102. Further, air in the one or more reference fluid holding chambers 102 can escape from the microfluidic chip 100 via the one or more air vents 1204 as the reference fluid 124 fills the reference fluid holding chamber 102. One of ordinary skill in the art will recognize that the layout and/or dimensions of the one or more reference fluid inlets 1202, air vents 1204, and/or reference fluid inlet channels 1206 can vary depending on a function of the microfluidic chip 100.

Figure 13A:
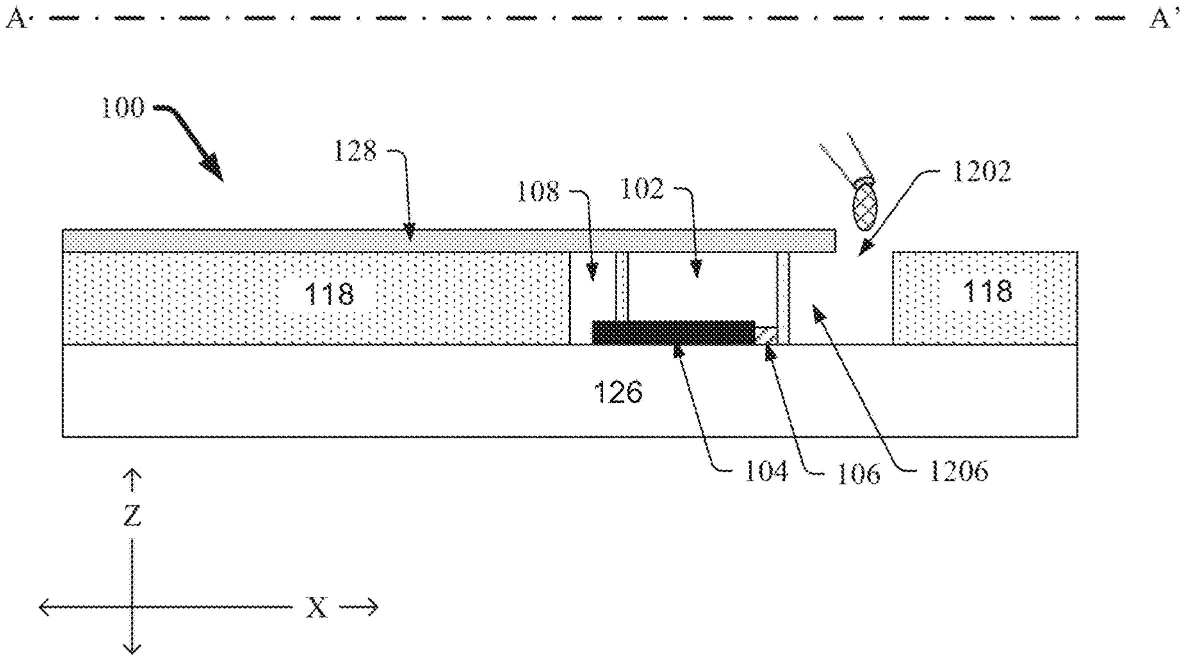
FIG. 13A illustrates a diagram of an example, non-limiting cross-sectional view of a microfluidic chip comprising one or more integrated electronic sensors and/or reference fluid inlets during a fluid loading process in accordance with one or more embodiments described herein.

FIGS. 13A and/or 13B illustrate diagrams of example, non-limiting cross-sectional views of the microfluidic chip 100 comprising one or more reference fluid inlets 1202 during a fluid loading process in accordance with one or more embodiments described herein. Repetitive description of like elements employed in other embodiments described herein is omitted for sake of brevity. In various embodiments, the one or more reference fluid inlets 1202, reference fluid inlet channels 1206, and/or air vents 1204 can be formed during the third stage of manufacturing depicted in FIGS. 6A-6C. For example, the one or more chip walls 118 can be patterned onto the substrate 126 so as to form the one or more reference fluid inlets 1202, reference fluid inlet channels 1206, and/or air vents 1204 via the one or more deposition processes (e.g., additive techniques). Additionally, the one or more seal layers 128 can be deposited onto the one or more chip walls 118, covering the one or more reference fluid holding chambers 102, prior to loading of the one or more reference fluids 124. Further, the fluid loading process can be an extension to the stages of manufacturing depicted in FIGS. 4A-6C and/or can be performed by a user of the microfluidic chip 100 post manufacturing.

Figure 13B:
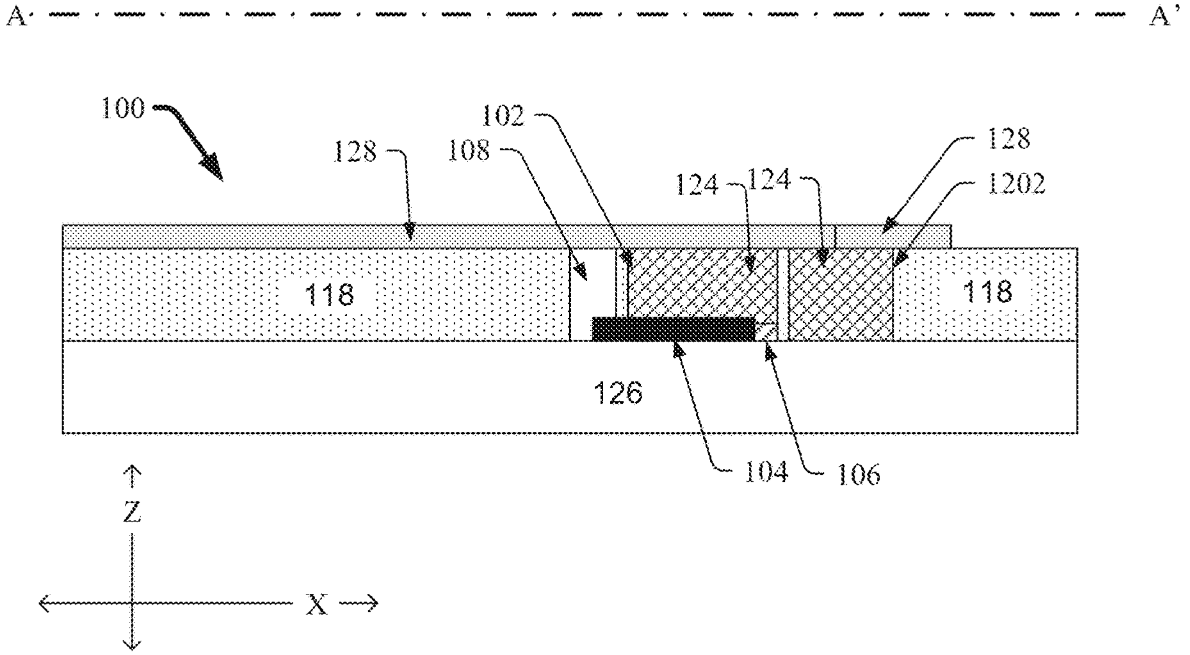
FIG. 13B illustrates a diagram of an example, non-limiting cross-sectional view of a microfluidic chip comprising one or more integrated electronic sensors and/or reference fluid inlets during a fluid loading process in accordance with one or more embodiments described herein.

As shown in FIG. 13A, subsequent to the formation of the one or more reference fluid inlets 1202 during the third stage of manufacturing and/or the sealing of the reference fluid holding chamber 102 via the one or more sealing layers 128, the one or more reference fluids 124 can be supplied to the one or more reference fluid inlets 1202. For example, the one or more reference fluids 124 can be deposited into the one or more reference fluid inlets 1202 via the top surface of the microfluidic chip 100 (e.g., as shown in FIG. 13A). FIG. 13B further shows that one or more additional sealing layers 128 (e.g., adhesive layers) can be positioned over the one or more reference fluid inlets 1202 after supplying the one or more reference fluids 124. Additionally, the one or more air vents 1204 can be covered by one or more additional sealing layers 128 subsequent to filling the one or more reference fluid holding chambers 102.

Figure 14A:
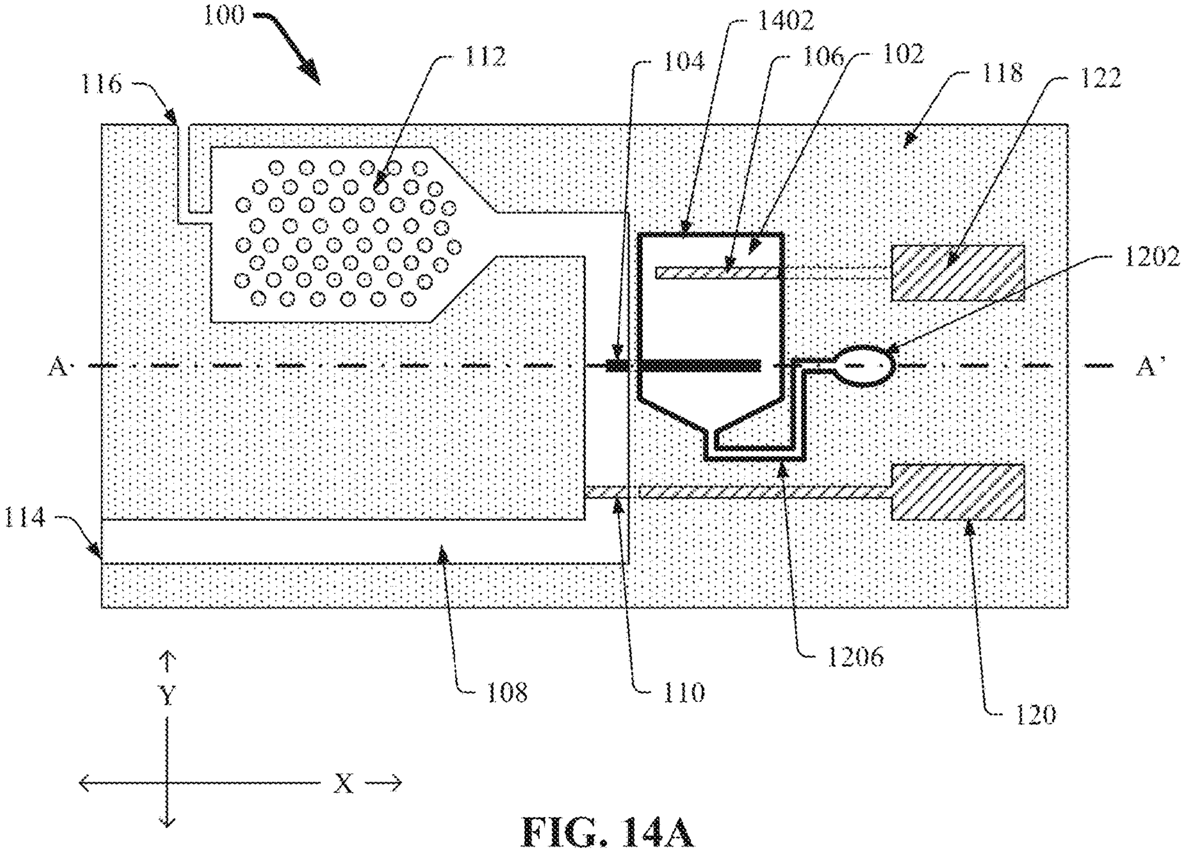
FIG. 14A illustrates a diagram of an example, non-limiting top-down view of a microfluidic chip comprising one or more integrated electronic sensors and/or reference fluid inlets in accordance with one or more embodiments described herein.

FIG. 14A illustrates a diagram of an example, non-limiting top-down view of the microfluidic chip 100 comprising a reference fluid inlet 1202 and/or reference fluid inlet channel 1206 lined with one or more hydrophobic layers 1402 in accordance with one or more embodiments described herein. Repetitive description of like elements employed in other embodiments described herein is omitted for sake of brevity. In one or more embodiments, the one or more reference fluid holding chambers 102, reference fluid inlets 1202, and/or reference fluid inlet channels 1206 can be lined with one or more hydrophobic layers 1402 (e.g., as delineated by bold lines in FIG. 14A).

In various embodiments, the one or more hydrophobic layers 1402 can facilitate the release of air from the one or more reference fluid holding chambers 102 during a loading process without the inclusion of the one or more air vents 1204. Example materials that can be comprised within the one or more hydrophobic layers 1402 can include, but are not limited to: black silicon, one or more metallic layers (e.g., comprising gold, platinum, palladium, a combination thereof, and/or the like) functionalized using a hydrophobic self-assembled monolayer, one or more hydrophobic polymers (e.g., octafluorocyclobutane, polytetrafluoroethylene ("Teflon")), a combination thereof, and/or the like. In various embodiments, the one or more reference fluid inlets 1202, reference fluid inlet channels 1206, and/or hydrophobic layers 1402 can enable reference fluid 124 to be supplied to the one or more reference fluid holding chambers 102 subsequent to covering the one or more reference fluid holding chambers 102 with the one or sealing layers 128. For example, FIG. 14A depicts the microfluidic chip 100 in an unloaded state, wherein the microfluidic chip 100 has yet to undergo one or more fluid loading processes to introduce reference fluid 124 to the one or more reference fluid holding chambers 102.

Figure 14B:
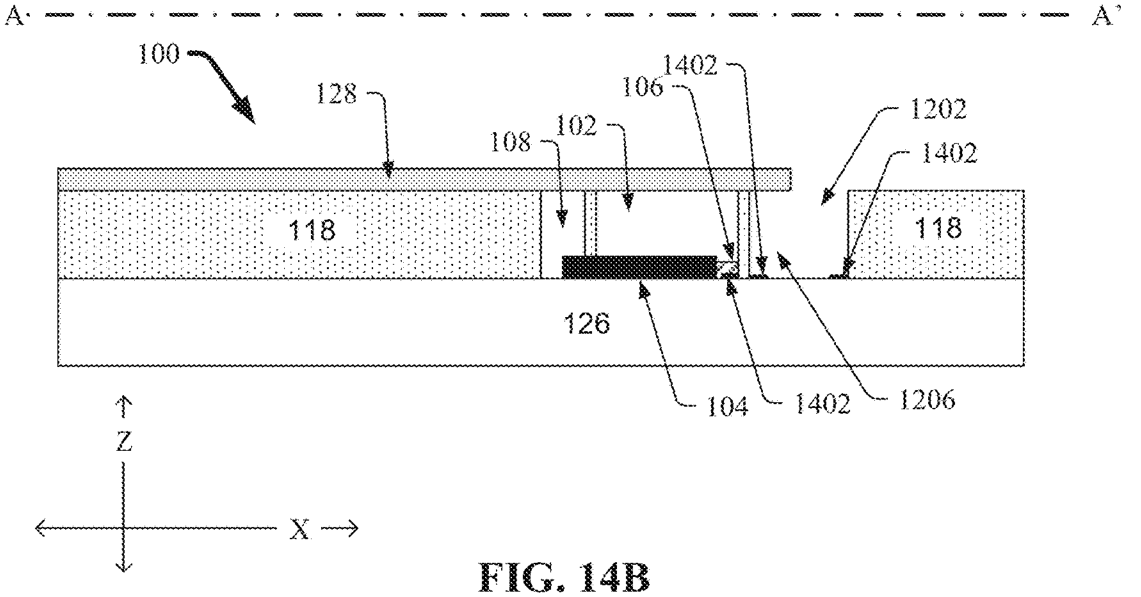
FIG. 14B illustrates a diagram of an example, non-limiting cross-sectional view of a microfluidic chip comprising one or more integrated electronic sensors and/or reference fluid inlets in accordance with one or more embodiments described herein.

FIG. 14B illustrates a diagram of an example, non-limiting cross-sectional view of the microfluidic chip 100 comprising the one or more hydrophobic layers 1402 in accordance with one or more embodiments described herein. Repetitive description of like elements employed in other embodiments described herein is omitted for sake of brevity. As shown in FIG. 14B, the one or more microfluidic channels 108 and/or reference fluid holding chambers 102 can be covered by the one or more sealing layers 128 while the microfluidic chip 100 is still in the unloaded state. Further, the one or more sealing layers 128 can extend over the one or more reference fluid inlet channels 1206 while the microfluidic chip 100 is in the unloaded state (e.g., as shown in FIG. 14B).

The one or more reference fluid inlets 1202 can remain uncovered in the unloaded state. Reference fluid 124 can be introduced into the one or more reference fluid holding chambers 102 by suppling the reference fluid 124 to the one or more reference fluid inlets 1202. Thereby, one or more capillary forces can facilitate a migration of reference fluid 124 from the one or more reference fluid inlets 1202, through the one or more reference fluid inlet channels 1206, and into the one or more reference fluid holding chambers 102. Further, air in the one or more reference fluid holding chambers 102 can escape from the microfluidic chip 100 via the one or more reference fluid inlets 1202 as the reference fluid 124 is added.

As shown in FIG. 14B, in one or more embodiments the one or more hydrophobic layers 1402 can be positioned on the substrate 126 adjacent to the one or more chip walls 118. The one or more hydrophobic layers 1402 can prevent the side walls of the one or more reference fluid holding chambers 102, reference fluid inlet channels 1206, and/or reference fluid inlets 1202 from becoming wetted by the reference fluid 124. Thereby, the one or more hydrophobic layers 1402 can generate one or more air gaps along the side walls, wherein air escaping the one or more reference fluid holding chambers 102 can travel along the side walls and through the reference fluid inlet 1202. Thus, the one or more hydrophobic layers 1402 can enabled the introduced reference fluid 124 and the escaping air can simultaneously travel through the one or more reference fluid inlet channels 1206 in opposite directions.

The one or more microfluidic chips 100 comprising hydrophobic layers 1402 can be fabricated in accordance with the first three stages of manufacturing described herein with regards to FIGS. 4A-6C. For example, the one or more chip walls 118 can be patterned onto the substrate 126 so as to form the one or more reference fluid inlets 1202 and/or reference fluid inlet channels 1206 via the one or more deposition processes (e.g., additive techniques). Also, the one or more hydrophobic layers 1402 can be deposited alongside the chip walls 118 that define the reference fluid holding chamber 102, reference fluid inlet channels 1206, and/or reference fluid inlet 1202. In one or more embodiments, the one or more hydrophobic layers 1402 can be deposited and/or patterned on the substrate 126 adjacent to the one or more chip walls 118. Additionally, the one or more seal layers 128 can be deposited onto the one or more chip walls 118, covering the one or more reference fluid holding chambers 102, prior to loading of the one or more reference fluids 124. Further, loading the one or more microfluidic chips 100 comprising hydrophobic layers 1402 with reference fluid 124 can be performed in accordance with the load process described herein with regards to FIGS. 13A and/or 13B.

Figure 15A:
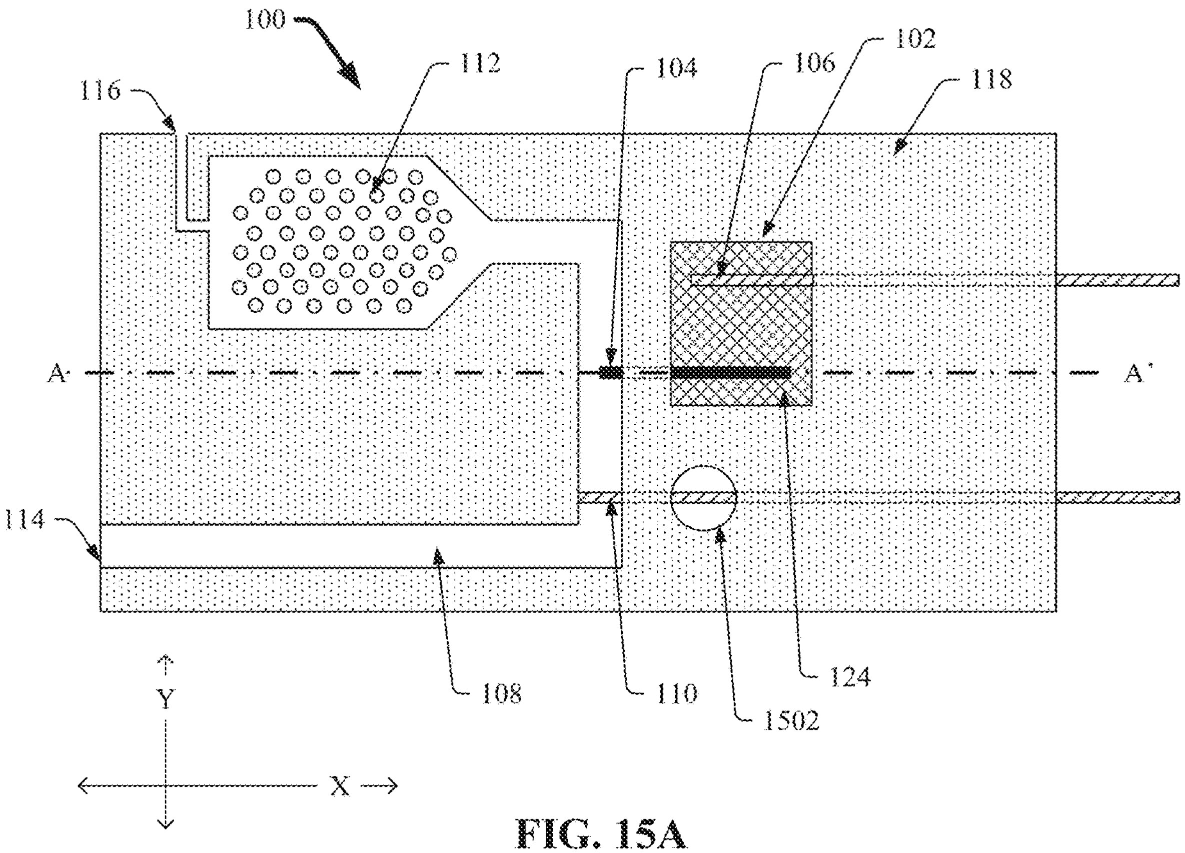
FIG. 15A illustrates a diagram of an example, non-limiting top-down view of a microfluidic chip comprising one or more integrated electronic sensors in accordance with one or more embodiments described herein.

FIG. 15A illustrates a diagram of an example, non-limiting top-down view of the microfluidic chip 100 comprising chip walls 118 made from a polymer material and/or one or more wire electrodes in accordance with one or more embodiments described herein. Repetitive description of like elements employed in other embodiments described herein is omitted for sake of brevity. In one or more embodiments, the one or more chip walls 118 can be comprised of one or more polymer materials that can enable the formation of thicker defining walls between microfluidic features (e.g., having a thickness along the "X" axis ranging, for example, from greater than or equal to 200 μm and less than or equal to 300 μm).

For example, wherein the chip walls 118 are formed from polymer materials, the chip wall 118 separating the microfluidic channel 108 from the reference fluid holding chamber 102 can have a width (e.g., along the "X" axis and/or delineated by the "G" arrows) that is greater than 500 μm. The enhanced structural integrity provided by the polymer material can enable the microfluidic features to exhibited increased dimensions. For example, the one or more microfluidic channels 108 and/or reference fluid holding chambers 102 can have increased widths (e.g., along the "X" axis), lengths (e.g., along the "Y" axis), and/or heights (e.g., along the "Z" axis).

Further, the enhanced structural integrity provided to the chip walls 118 by the polymer materials can enable the one or more reference electrodes 106, conductive plugs 104, and/or sensing electrodes 110 to have a wire structure and/or be inserted through the chip walls 118 post fabrication of the one or more microfluidic channels 108 and/or reference fluid holding chambers 102. Example polymer materials that can be comprised within the one or more chip walls 118 can include, but are not limited to: PDMS, PMMA, COC, three-dimensional printing materials, a combination thereof, and/or the like.

In one or more embodiments, the microfluidic chip 100 can further include one or more gaskets and/or adhesives located wherever a wire electrode (e.g., wire reference electrode 106, wire conductive plug 104, and/or wire sensing electrode 110) meets a chip wall 118 so as to provide a seal that can maintain fluid isolation. Further, in one or more embodiments the microfluidic chip 100 can further comprise a cut-out section 1502 defined by the one or more chip walls 118 and/or positioned over the one or more sensing electrodes 110. The cut-out section 1502 can facilitate the incorporation of one or more gaskets and/or adhesives around the wire sensing electrode 110.

In various embodiments, the one or more microfluidic chips 100 comprising polymer material chip walls 118 and/or wire electrodes can further comprise any of the reference fluid supply structures described herein, such as the one or more: reference fluid inlets 1202, air vents 1204, reference fluid reservoirs 802, reference fluid inlet channels 1206, and/or hydrophobic layers 1402. For example, the one or more reference fluid inlets 1202, air vents 1204, and/or reference fluid inlet channels 1206 can be defined by the polymer chip walls 118.

Figure 15B:
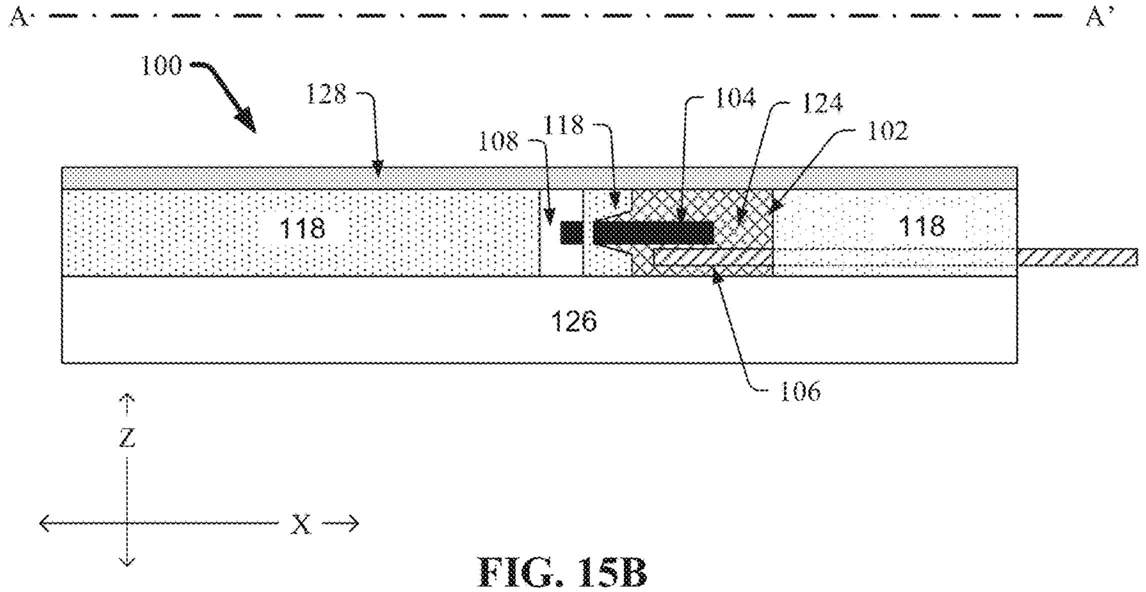
FIG. 15B illustrates a diagram of an example, non-limiting cross-sectional view of a microfluidic chip comprising one or more integrated electronic sensors in accordance with one or more embodiments described herein.

FIG. 15B illustrates a diagram of an example, non-limiting cross-sectional view of the microfluidic chip 100 comprising chip walls 118 made from a polymer material and/or one or more wire electrodes in accordance with one or more embodiments described herein. Repetitive description of like elements employed in other embodiments described herein is omitted for sake of brevity. As shown in FIG. 15B, the chip wall 118 separating the microfluidic channel 108 from the reference fluid holding chamber 102 can have a beveled portion where the wire conductive plug 104 extends through the chip wall 118.

In one or more embodiments, the beveled portion of the chip wall 118 can reduce a thickness (e.g., along the "X" axis) of the chip wall 118 that is traversed by the wire conductive plug 104. For example, wile the chip wall 118 separating the microfluidic channel 108 from the reference fluid holding chamber 102 can a width (e.g., along the "X" axis) of greater than 500 μm, the beveled portion can enable the wire conductive plug 104 to extend through thickness of just 10 to 500 μm while still reaching between the microfluidic channel 108 and the reference fluid holding chamber 102. By reducing the thickness of chip wall 118 that is penetrated by the wire conductive plug 104, the performance of the reference electrode structure can be enhanced. Additionally, the beveled portion can assist in placement of the wire conductive plug 104 during insertion into the microfluidic chip 100.

Figure 16A:
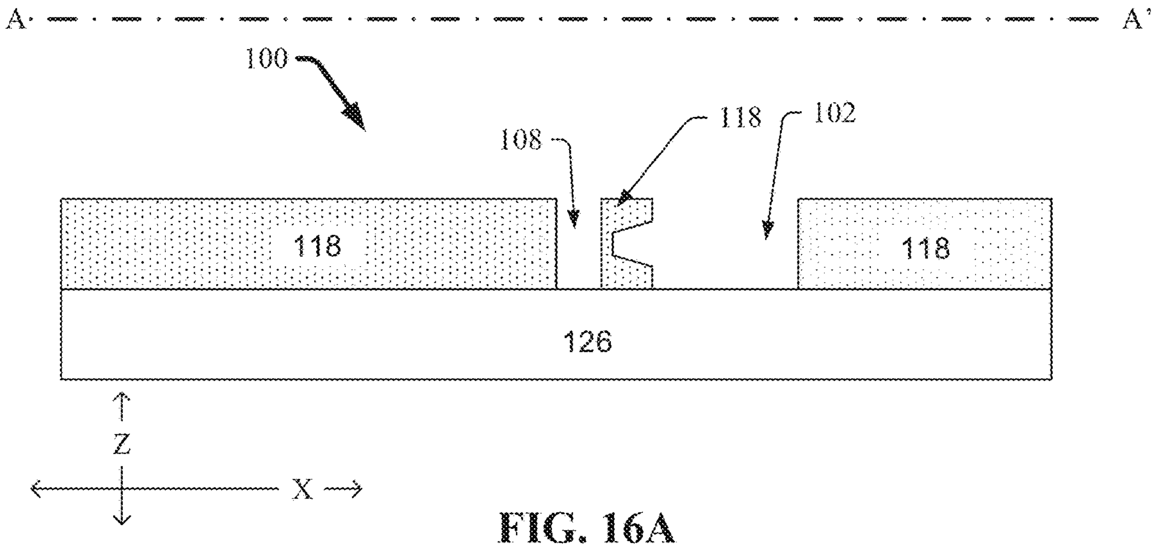
FIG. 16A illustrates a diagram of an example, non-limiting cross-sectional view of a microfluidic chip comprising one or more integrated electronic sensors during a first stage of manufacturing in accordance with one or more embodiments described herein.

FIG. 16A illustrates a diagram of an example, non-limiting cross-sectional view of the microfluidic chip 100 comprising one or more wire electrode structures (e.g., wire reference electrode 106, wire conductive plug 104, and/or wire sensing electrode 110) during a first stage of manufacturing in accordance with one or more embodiments described herein. Repetitive description of like elements employed in other embodiments described herein is omitted for sake of brevity. During the first stage of manufacturing, the one or more chip walls 118 can be fabricated.

In various embodiments, the one or more chip walls 118 can be deposited onto the substrate 126 via one or more deposition processes. For example, the one or more chip walls 118 can be deposited and/or patterned via one or more additive and/or structuring techniques, such as one or more injection molding processes, milling processes, three-dimensional printing processes, a combination thereof, and/or the like. For instance, the one or more chip walls 118 can be formed onto the substrate 126 such that the one or more microfluidic channels 108, microfluidic devices 112, and/or reference fluid holding chambers 102 can be defined (e.g., via injection molding processes, milling processes, three-dimensional printing processes, a combination thereof, and/or the like). In another instance, the one or more chip walls 118 can be three-dimensionally printed onto the substrate 126. Also, during the first stage of manufacturing one or more fluid reference inlets 1202, air vents 1204, and/or reference fluid inlet channels 1206 can be formed via one or more additive deposition processes in accordance with one or more embodiments described herein.

In various embodiments, the one or more chip walls 118 can be formed by etching a top surface of the substrate 126 via one or more etching processes. For example, the substrate 126 can comprise the one or more polymer materials, and one or more etching processes can be implemented to remove material from the substrate 126 to form the one or more one or more microfluidic channels 108, microfluidic devices 112, and/or reference fluid holding chambers 102. Also, during the first stage of manufacturing one or more fluid reference inlets 1202, air vents 1204, and/or reference fluid inlet channels 1206 can be formed via one or more etching processes in accordance with one or more embodiments described herein.

Figure 16B:
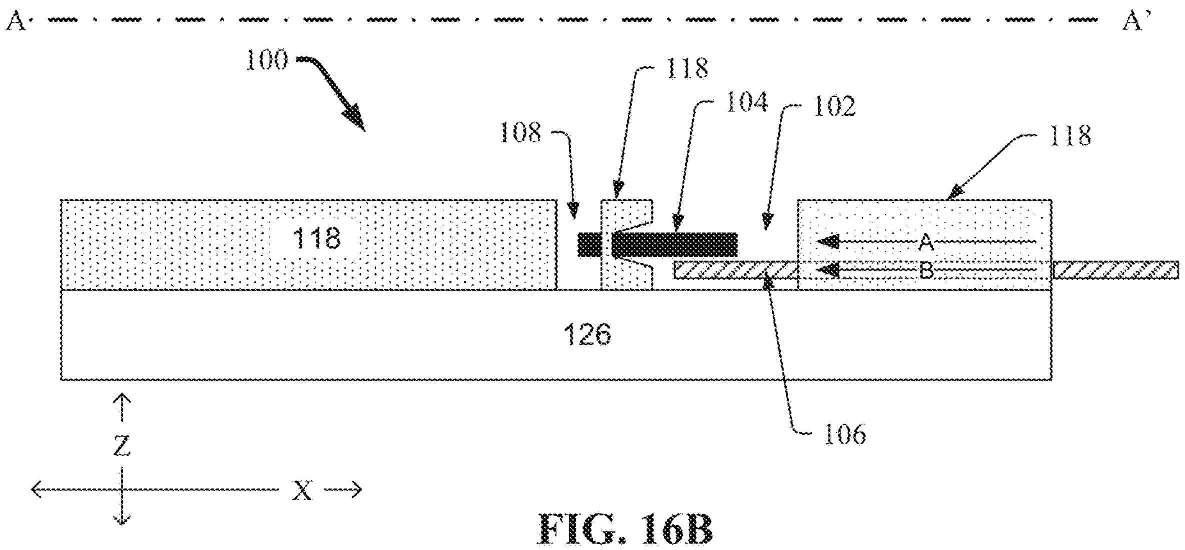
FIG. 16B illustrates a diagram of an example, non-limiting cross-sectional view of a microfluidic chip comprising one or more integrated electronic sensors during a first stage of manufacturing in accordance with one or more embodiments described herein.

FIG. 16B illustrates a diagram of an example, non-limiting cross-sectional view of the microfluidic chip 100 comprising one or more wire electrode structures (e.g., wire reference electrode 106, wire conductive plug 104, and/or wire sensing electrode 110) during a second stage of manufacturing in accordance with one or more embodiments described herein. Repetitive description of like elements employed in other embodiments described herein is omitted for sake of brevity. During the second stage of manufacturing, the one or more wire electrode structures (e.g., wire reference electrode 106, wire conductive plug 104, and/or wire sensing electrode 110) can be inserted through the one or more chip walls 118 to be positioned within the one or more microfluidic channels 108 and/or reference fluid holding chambers 102.

In one or more embodiments, the wire conducive plug 104 can be inserted through the chip wall 118 along the "A" insertion arrow depicted in FIG. 16B. For example, the wire conductive plug 104 can be inserted through the chip wall 118 into the reference fluid holding chamber 102 and through the beveled portion in chip wall 118 separating the microfluidic channel 108 from the reference fluid holding chamber 102. The wire reference electrode 106 can be inserted through the chip wall 118 along the "B" insertion arrow depicted in FIG. 16B. For example, the wire reference electrode 106 can be inserted through the chip wall 118 into the reference fluid holding chamber 102. In one or more embodiments, one or more pilot holes can be formed within the chip wall 118 along the "A" and/or "B" insertion arrows to facilitate insertion of the wire reference electrode 106 and/or wire conductive plug 104. Similarly, the wire sensing electrode 110 can be inserted through the chip wall 118 through the cut-out section 1502 and into the microfluidic channel 108. Further, in one or more embodiments, one or more gaskets and/or adhesives can be applied to the wire electrodes where the wire electrodes meet the chip walls 118 to maintain a fluidic seal and/or prevent fluid leaks between microfluidic features.

Figure 17A:
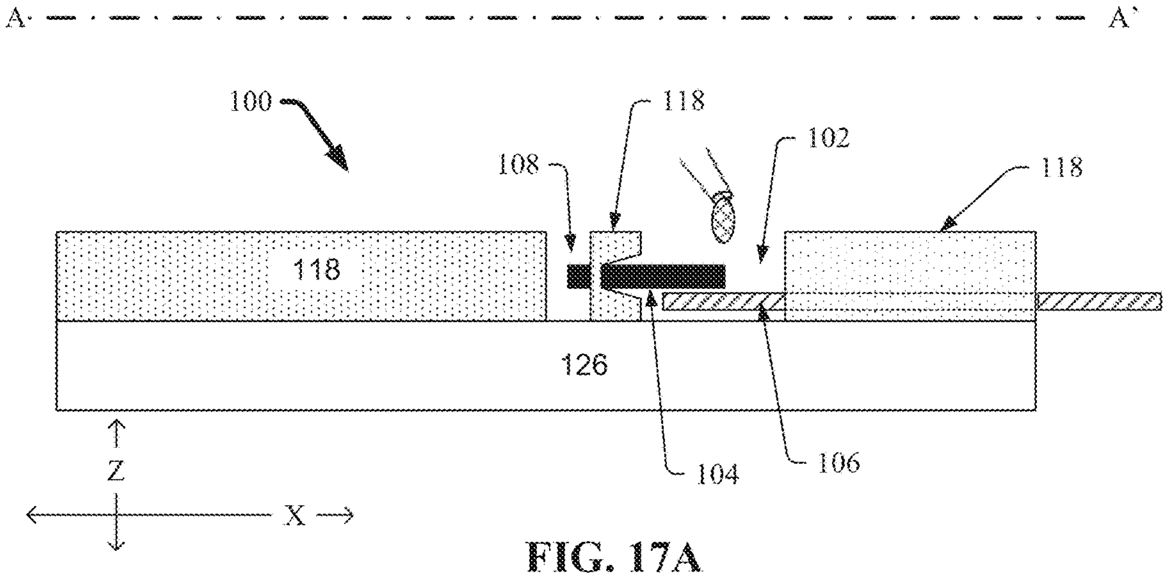
FIG. 17A illustrates a diagram of an example, non-limiting cross-sectional view of a microfluidic chip comprising one or more integrated electronic sensors during a reference fluid loading process in accordance with one or more embodiments described herein.

FIGS. 17A and/or 17B illustrate diagrams of example, non-limiting cross-sectional views of the microfluidic chip 100 comprising one or more wire electrodes during a fluid loading process in accordance with one or more embodiments described herein. Repetitive description of like elements employed in other embodiments described herein is omitted for sake of brevity. In various embodiments, the fluid loading process can be an extension to the stages of manufacturing depicted in FIGS. 16A-16B, and/or can be performed by a user of the microfluidic chip 100 post manufacturing.

Figure 17B:
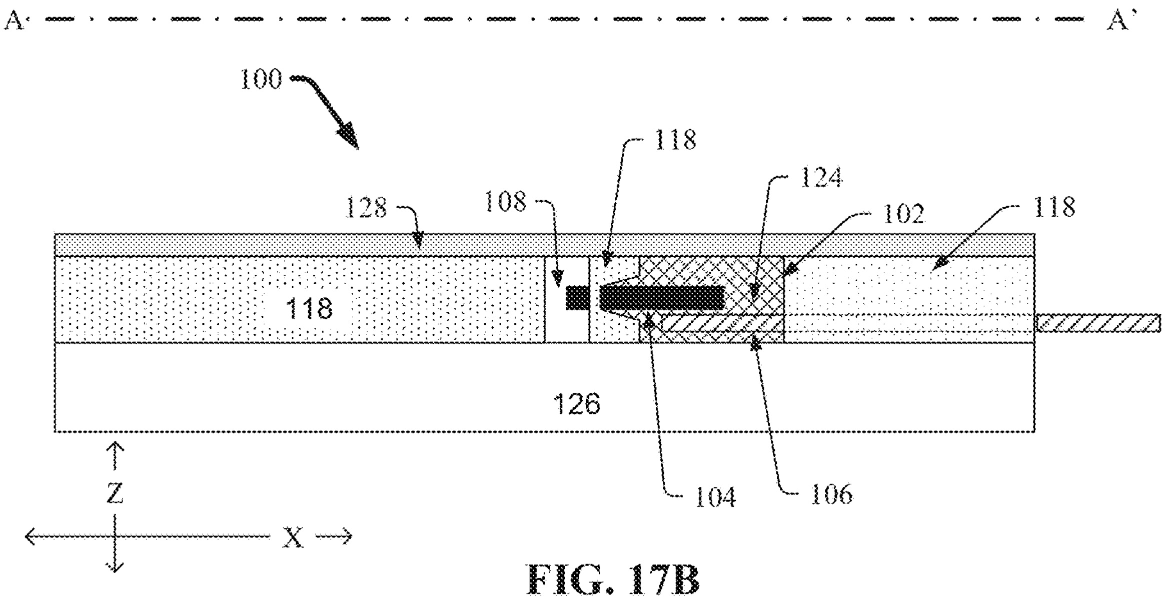
FIG. 17B illustrates a diagram of an example, non-limiting cross-sectional view of a microfluidic chip comprising one or more integrated electronic sensors during a reference fluid loading process in accordance with one or more embodiments described herein.

As shown in FIG. 17A, subsequent to the insertion of the one or more wire electrodes (e.g., wire reference electrode 106, wire conductive plug 104, and/or wire sensing electrode 110) during the second stage of manufacturing, the one or more reference fluids 124 can be supplied to the one or more reference fluid holding chambers 102. For example, the one or more reference fluids 124 can be deposited into the one or more reference fluid holding chambers 102 via the top surface of the microfluidic chip 100 (e.g., as shown in FIG. 17A). FIG. 17B further shows that the one or more sealing layers 128 can be positioned over the one or more reference fluid holding chambers 102, and/or microfluidic channels 108, after supplying the one or more reference fluids 124.

Figure 18A:
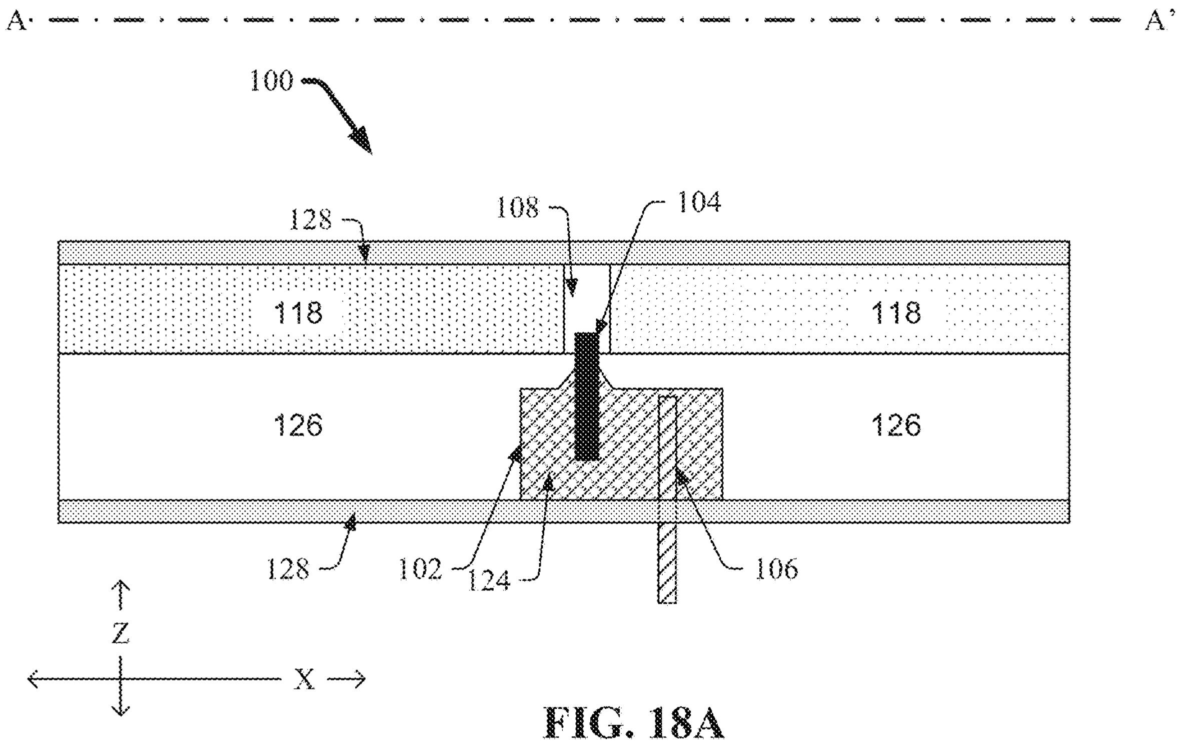
FIG. 18A illustrates a diagram of an example, non-limiting cross-sectional view of a microfluidic chip comprising one or more integrated electronic sensors in accordance with one or more embodiments described herein.

FIGS. 18A and/or 18B illustrate diagrams of example, non-limiting cross-sectional views of microfluidic chips 100 comprising reference electrode structures positioned beneath the one or more microfluidic channels 108 in accordance with one or more embodiments described herein. Repetitive description of like elements employed in other embodiments described herein is omitted for sake of brevity.

As shown in FIG. 18A, the one or more reference fluid holding chambers 102 can be positioned beneath under the one or more microfluidic channels 108 along the "Z" axis. For example, the one or more wire conductive plugs 104 can extend from the reference fluid holding chamber 102 through a floor of the microfluidic channel 108 (e.g., which can comprise a beveled portion in accordance with various embodiments described herein). Further, the microfluidic chip 100 can comprise a plurality of sealing layers 128. For instance, a first sealing layer 128 can be positioned on a top surface of the microfluidic chip 100 and/or cover the one or more microfluidic channels 108; while a second sealing layer 128 can be positioned on a bottom surface of the microfluidic chip 100 and/or cover the one or more reference fluid holding chambers 102 (e.g., as shown in FIG. 18A).

Figure 18B:
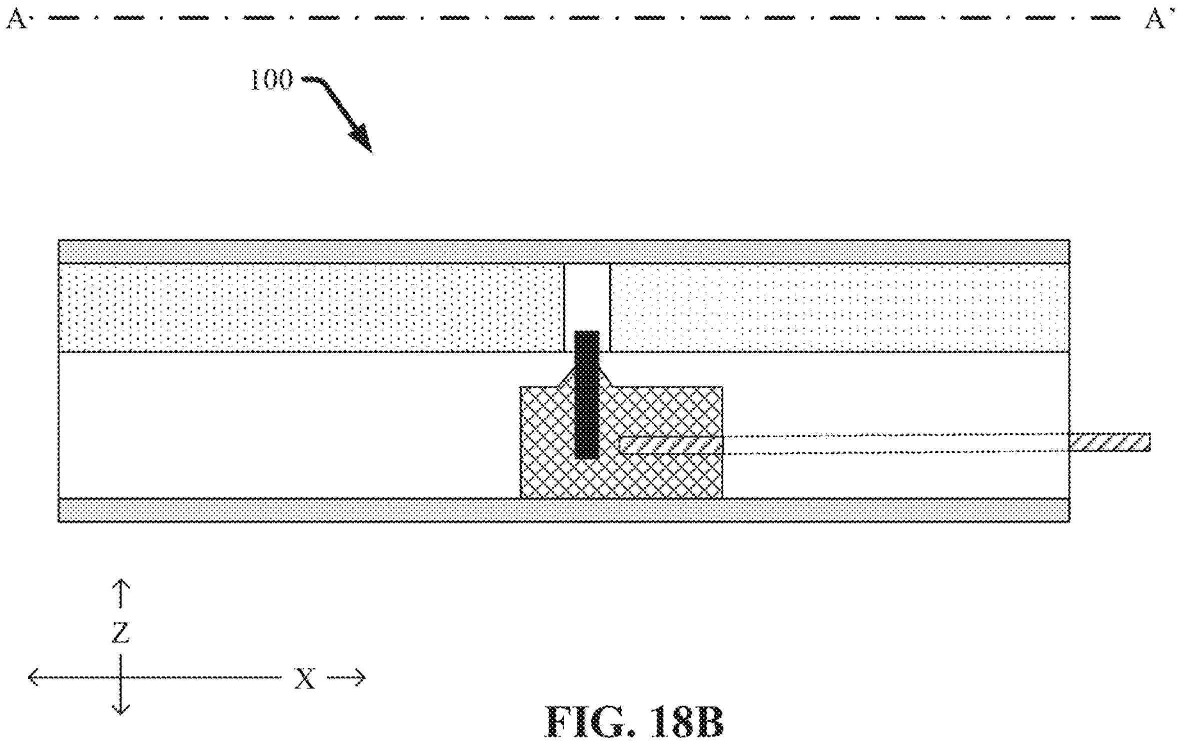
FIG. 18B illustrates a diagram of an example, non-limiting cross-sectional view of a microfluidic chip comprising one or more integrated electronic sensors in accordance with one or more embodiments described herein.

In one or more embodiments, the wire reference electrode 106 can extend from the reference fluid holding chamber 102 through the second sealing layer 128. As shown in FIG. 18B, in one or more embodiments, the wire reference electrode 106 can extend through the substrate 126 and into a side of the reference fluid holding chamber 102. Similarly, in various embodiments, the one or more wire sensing electrodes 110 can extend: through the bottom of one or more microfluidic channels 108, through the substrate 126, and/or through the second sealing layer 128 or a side of the substrate 126.

Figure 19:
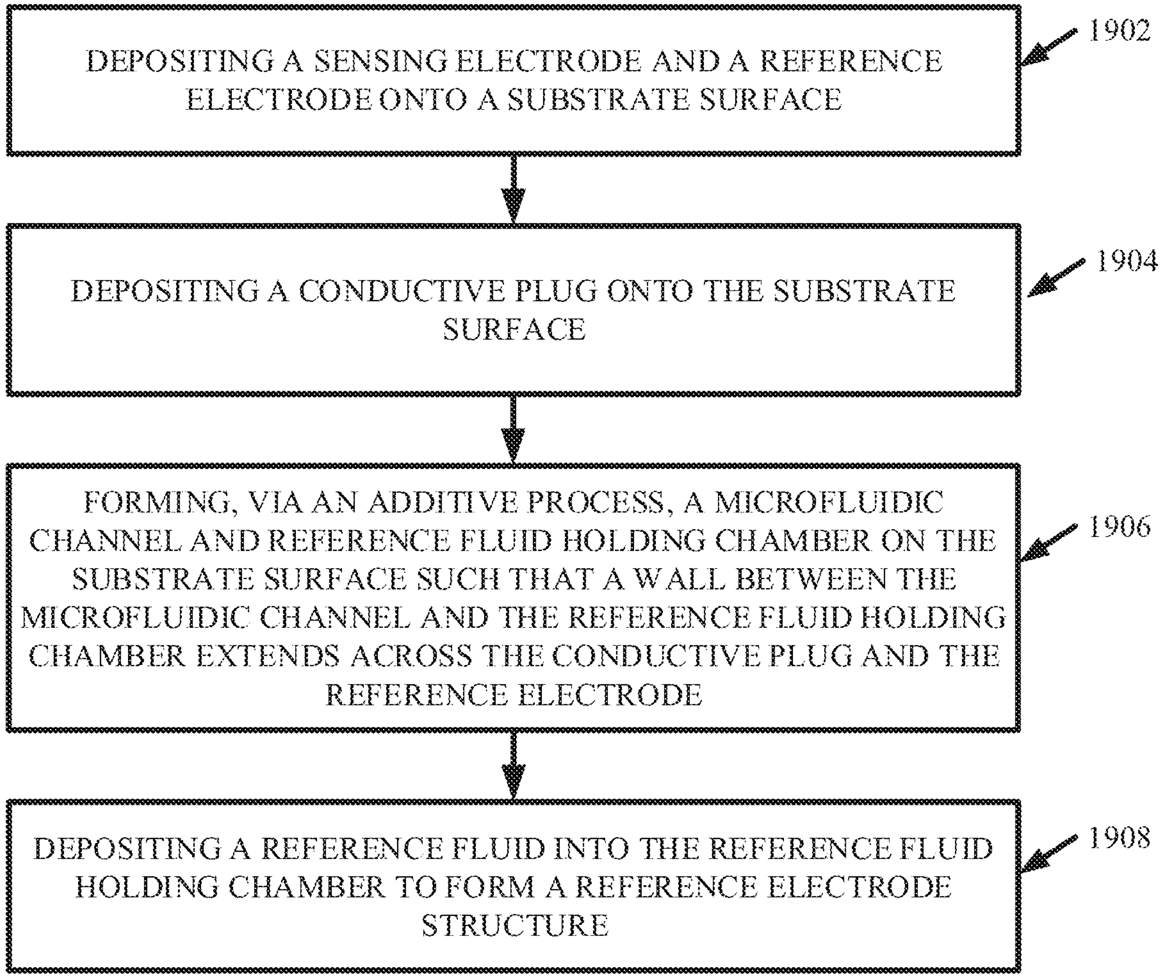
FIG. 19 illustrates a flow diagram of an example, non-limiting method that can facilitate manufacturing of one or more microfluidic chip comprising one or more integrated electronic sensors in accordance with one or more embodiments described herein.

FIG. 19 illustrates a flow diagram of an example, non-limiting method 1900 that can facilitate manufacturing one or more microfluidic chips 100 in accordance with one or more embodiments described herein. Repetitive description of like elements employed in other embodiments described herein is omitted for sake of brevity.

At 1902, the method 1900 can comprise depositing one or more sensing electrodes 110 and/or reference electrodes 106 onto a substrate 126 surface. For example, the depositing at 1902 can be performed in accordance with the first stage of manufacturing depicted in FIGS. 4A-4B. For instance, the depositing at 1902 can be performed via one or more additive deposition processes in accordance with one or more embodiments described herein. In one or more embodiments, the depositing at 1902 can further form one or more sensing contact pads 120 and/or reference contact pads 122 operably coupled to the one or more sensing electrodes 110 and/or reference electrodes 106.

At 19004, the method 1900 can comprise depositing (e.g., via one or more deposition processes) one or more conductive plugs 104 onto the substrate 126 surface. For example, the depositing at 1904 can be performed in accordance with the second stage of manufacturing depicted in FIGS. 5A-5C.

At 1906, the method 1900 can comprise forming, via one or more additive processes (e.g., deposition processes), one or more microfluidic channels 108 and/or reference fluid holding chambers 102 on the substrate 126 surface such that one or more walls (e.g., chip wall 118) between the one or more microfluidic channels 108 and reference fluid holding chambers 102 extends across the one or more conductive plug 104 and/or reference electrode 106. For example, the forming at 1906 can be performed in accordance with the third stage of manufacturing depicted in FIGS. 6A-6C. In various embodiments, the forming at 1906 can further fabricate one or more reference fluid inlets 1202, air vents 1204, and/or reference fluid inlet channels 1206. Further, in one or more embodiments the method 1900 can also comprise adhering a reference fluid reservoir 802 to the one or more walls (e.g., chip walls 118) such that the reference fluid reservoir 802 can be in fluid communication with the reference fluid holding chamber 102.

At 1908, the method 1900 can comprise depositing one or more reference fluids 124 into the one or more reference fluid holding chambers 102 to form one or more reference electrode structures. For example, the depositing at 1908 can be performed in accordance with the one or more loading processes depicted in FIGS. 7A-7B. In another example, the depositing at 1908 can be performed in accordance with the one or more loading processes depicted in FIGS. 11A-11B and/or 13A-13B.

Figure 20:
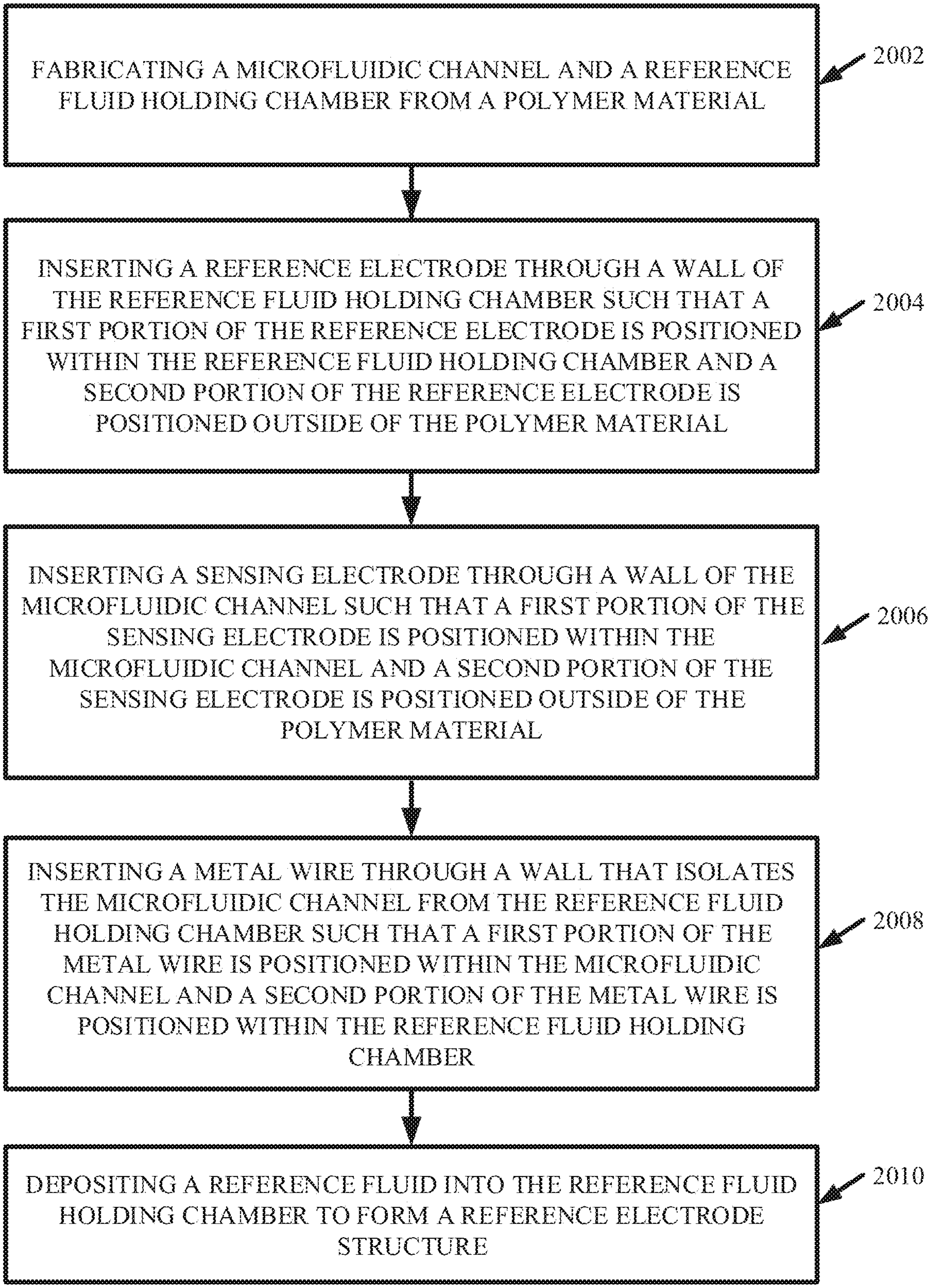
FIG. 20 illustrates a flow diagram of an example, non-limiting method that can facilitate manufacturing of one or more microfluidic chip comprising one or more integrated electronic sensors in accordance with one or more embodiments described herein.

FIG. 20 illustrates a flow diagram of an example, non-limiting method 2000 that can facilitate manufacturing one or more microfluidic chips 100 in accordance with one or more embodiments described herein. Repetitive description of like elements employed in other embodiments described herein is omitted for sake of brevity.

At 2002, the method 2000 can comprise fabricating one or more microfluidic channels 108 and/or reference fluid holding chambers 102 from a polymer material. For example, the fabricating at 2002 can be performed in accordance with the first stage of manufacturing depicted in FIG. 16A. For instance, the fabricating at 2002 can comprise one or more deposition processes that can deposit one or more chip walls 118 made of the polymer material onto a surface of a substrate 126. In another instance, the fabricating at 2002 can comprise one or more etching processes that can remove material from a surface of the substrate 126 to form the one or more microfluidic channels 108 and/or reference fluid holding chambers 102. Additionally, the fabricating at 2002 can comprise forming one or more reference fluid inlets 1202, reference fluid inlet channels 1206, and/or air vents 1204 via the one or more deposition and/or etching processes in accordance with one or more embodiments described herein.

At 2004, the method 2000 can comprise inserting one or more reference electrodes 106 through a wall of the reference fluid holding chamber 102 such that first portion of the one or more reference electrodes 106 is positioned within the reference fluid holding chamber 102 and a second portion of the one or more reference electrodes 106 is positioned outside of the polymer material. For example, the inserting at 2004 can be performed in accordance with the second stage of manufacturing depicted in FIG. 16B. For instance, the one or more reference electrodes 106 can have a wire structure and/or can extend through one or more chip walls 118 formed during the fabricating at 2002. Further, the one or more reference electrodes 106 can extend between the reference fluid holding chamber 102 and one or more transducers (e.g., positioned on or off the microfluidic chip 100).

At 2006, the method 2000 can comprise inserting one or more sensing electrodes 110 through a wall of the one or more microfluidic channels 108 such that a first portion of the one or more sensing electrodes 110 can be positioned within the one or more microfluidic channels 108 and/or a second portion of the one or more sensing electrodes 110 can be positioned outside of the polymer material. For example, the inserting at 2006 can be performed in accordance with the second stage of manufacturing described herein regarding FIG. 16B. For instance, the one or more sensing electrodes 110 can have a wire structure and/or can extend through one or more chip walls 118 formed during the fabricating at 2002. Further, the one or more sensing electrodes 110 can extend between the microfluidic channel 108 and one or more transducers (e.g., positioned on or off the microfluidic chip 100).

At 2008, the method 2000 can comprise inserting a metal wire (e.g., a wire conductive plug 104) through a wall (e.g., chip wall 118) that can isolate the microfluidic channel 108 from the reference fluid holding chamber 102 such that a first portion of the metal wire is positioned within the microfluidic channel 108 and a second portion of the metal wire is positioned within the reference fluid holding chamber 102. For example, the inserting at 2008 can be performed in accordance with the second stage of manufacturing depicted in FIG. 16B. For instance, the one or more sensing electrodes 110 can have a wire structure and/or can extend through one or more chip walls 118 formed during the fabricating at 2002.

At 2010, the method 2000 can comprise depositing a reference fluid 124 into the reference fluid holding chamber 102 to form one or more reference electrode structures. For example, the depositing at 2010 can be performed in accordance with the one or more loading processes depicted in FIGS. 17A-17B.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is, of course, not possible to describe every conceivable combination of components, products and/or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

depositing a conductive plug onto a substrate surface;

forming, via an additive process, a microfluidic channel and a reference fluid holding chamber on the substrate surface such that a wall between the microfluidic channel and the reference fluid holding chamber extends across the conductive plug; and depositing an electrode on the substrate surface, wherein the forming the fluid holding chamber results in a wall of the reference fluid holding chamber extending across the electrode.

2. The method of claim 1, further comprising:

depositing a sensing electrode and a reference electrode on the substrate surface, wherein the wall further extends across the sensing electrode.

3. The method of claim 2, wherein the forming the microfluidic channel and the reference fluid holding chamber results in a wall of the reference fluid holding chamber extending across the reference electrode.

4. The method of claim 3, further comprising:

adhering a reference fluid reservoir to the reference fluid holding chamber, wherein the reference fluid reservoir and the fluid holding chamber are in fluid communication.

5. The method of claim 1, further comprising:

depositing a reference fluid into the reference fluid holding chamber to form a reference electrode structure.

* * * * *